(12) United States Patent
Chen et al.

(10) Patent No.: US 9,503,720 B2
(45) Date of Patent: Nov. 22, 2016

(54) MOTION VECTOR CODING AND BI-PREDICTION IN HEVC AND ITS EXTENSIONS

(71) Applicant: QUALCOMM Incorporated, San Diego, CA (US)

(72) Inventors: Ying Chen, San Diego, CA (US); Ye-Kui Wang, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 494 days.

(21) Appl. No.: 13/801,350

(22) Filed: Mar. 13, 2013

(65) Prior Publication Data

US 2013/0243093 A1    Sep. 19, 2013

Related U.S. Application Data

(60) Provisional application No. 61/611,959, filed on Mar. 16, 2012, provisional application No. 61/624,990, filed on Apr. 16, 2012, provisional application No. 61/658,344, filed on Jun. 11, 2012, provisional application No. 61/663,484, filed on Jun. 22, 2012.

(51) Int. Cl.
*H04N 7/12* (2006.01)
*H04N 11/02* (2006.01)
(Continued)

(52) U.S. Cl.
CPC ...... *H04N 19/00733* (2013.01); *H04N 19/139* (2014.11); *H04N 19/51* (2014.11); *H04N 19/52* (2014.11); *H04N 19/597* (2014.11); *H04N 19/70* (2014.11); *H04N 19/105* (2014.11)

(58) Field of Classification Search
CPC ........ H04N 7/12; H04N 11/02; H04N 11/04; H04N 7/26; H04B 1/66
See application file for complete search history.

(56) References Cited

U.S. PATENT DOCUMENTS 7,876,828 B2   1/2011   Lee et al.
8,165,216 B2   4/2012   Chen et al.
(Continued)

FOREIGN PATENT DOCUMENTS

EP   1377067 A1   1/2004
JP   2009510892 A   3/2009
(Continued)

OTHER PUBLICATIONS

Bossen, et al, Simplified motion vector coding method, Joint Collaborative Team on Video Coding (JCT-VC)of ITU-T SG16 WP3 and ISO/IEC JTC1/SC29/WG11JCTVC-B09 4, Retreived from the internet: <http://wftp3.itu.int/av-arch/jctvc-site/2010_07_B_Geneva/JCTVC-B094.doc>, Jul. 2010, 5 pp.

(Continued)

*Primary Examiner* — Sath V Perungavoor
*Assistant Examiner* — Patricia I Young
(74) *Attorney, Agent, or Firm* — Shumaker & Sieffert, P.A.

(57) ABSTRACT

In one example, a device includes a video coder (e.g., a video encoder or a video decoder) configured to determine that a block of video data is to be coded in accordance with a three-dimensional extension of High Efficiency Video Coding (HEVC), and, based the determination that the block is to be coded in accordance with the three-dimensional extension of HEVC, disable temporal motion vector prediction for coding the block. The video coder may be further configured to, when the block comprises a bi-predicted block (B-block), determine that the B-block refers to a predetermined pair of pictures in a first reference picture list and a second reference picture list, and, based on the determination that the B-block refers to the predetermined pair, equally weight contributions from the pair of pictures when calculating a predictive block for the block.

55 Claims, 6 Drawing Sheets

(51) Int. Cl.
  H04N 7/26      (2006.01)
  H04N 19/583    (2014.01)
  H04N 19/597    (2014.01)
  H04N 19/52     (2014.01)
  H04N 19/139    (2014.01)
  H04N 19/70     (2014.01)
  H04N 19/51     (2014.01)
  H04N 19/105    (2014.01)

(56) References Cited

U.S. PATENT DOCUMENTS

| | | |
|---|---|---|
| 2007/0014346 A1 | 1/2007 | Wang et al. |
| 2007/0064800 A1 | 3/2007 | Ha |
| 2007/0071107 A1 | 3/2007 | Ha |
| 2008/0219351 A1 | 9/2008 | Kim et al. |
| 2009/0010323 A1 | 1/2009 | Su et al. |
| 2009/0190662 A1 | 7/2009 | Park et al. |
| 2009/0238269 A1 | 9/2009 | Pandit et al. |
| 2009/0290643 A1 | 11/2009 | Yang |
| 2009/0304068 A1 | 12/2009 | Pandit et al. |
| 2009/0304084 A1 | 12/2009 | Hallapuro et al. |
| 2009/0310676 A1 | 12/2009 | Yang |
| 2010/0002762 A1 | 1/2010 | Pandit et al. |
| 2010/0027615 A1 | 2/2010 | Pandit et al. |
| 2010/0034258 A1 | 2/2010 | Pandit et al. |
| 2010/0091844 A1 | 4/2010 | Jeon et al. |
| 2010/0118944 A1 | 5/2010 | Tanaka et al. |
| 2010/0166074 A1 | 7/2010 | Ho et al. |
| 2010/0189173 A1 | 7/2010 | Chen et al. |
| 2010/0220790 A1 | 9/2010 | Jeon et al. |
| 2010/0246683 A1 | 9/2010 | Webb et al. |
| 2011/0080954 A1 | 4/2011 | Bossen et al. |
| 2011/0176615 A1 | 7/2011 | Lee et al. |
| 2011/0317930 A1 | 12/2011 | Kim et al. |
| 2012/0189059 A1 | 7/2012 | Segall |
| 2012/0189060 A1 | 7/2012 | Lee et al. |
| 2012/0213282 A1 | 8/2012 | Choi et al. |
| 2012/0269270 A1 | 10/2012 | Chen et al. |
| 2012/0269271 A1 | 10/2012 | Chen et al. |
| 2013/0243081 A1 | 9/2013 | Chen et al. |
| 2013/0272408 A1 | 10/2013 | Chen |
| 2013/0322536 A1 | 12/2013 | Yang |

FOREIGN PATENT DOCUMENTS

| | | |
|---|---|---|
| JP | 2009523355 A | 6/2009 |
| JP | 2009543508 A | 12/2009 |
| JP | 2010520697 A | 6/2010 |
| JP | 2014513897 A | 6/2014 |
| KR | 20070036611 A | 4/2007 |
| KR | 20090046826 A | 5/2009 |
| KR | 20100081984 A | 7/2010 |
| WO | 2008007913 A1 | 1/2008 |
| WO | 2008047303 A2 | 4/2008 |
| WO | 2008053746 A1 | 5/2008 |
| WO | 2009051419 A2 | 4/2009 |
| WO | 2010043773 A1 | 4/2010 |
| WO | 2012124121 A1 | 9/2012 |
| WO | 2013028116 A1 | 2/2013 |
| WO | 2013030456 A1 | 3/2013 |

OTHER PUBLICATIONS

Bross, et al., "High Efficiency Video Coding (HEVC) text specification draft 10 (for FDIS & Last Call)", Joint Collaborative Team on Video Coding (JCT-VC) of ITU-T SG16 WP3 and ISO/IEC JTC1/SC29/WG11, JCTVC-L1003_v34, 12th Meeting: Geneva, CH, Jan. 14-23, 2013, 310 pp.

ITU-T H.264, Series H: Audiovisual and Multimedia Systems, Infrastructure of audiovisual services—Coding of moving video, Advanced video coding for generic audiovisual services, Mar. 2005, 343 pp.

ITU-T H.265, Series H: Audiovisual and Multimedia Systems, Infrastructure of audiovisual services—Coding of moving video, High efficiency video coding, the International Telecommunication Union, Apr. 2013, 317 pp.

Vetro, et al. "Joint Draft 8.0 on Multiview Video Coding", 28th JVT meeting, Hannover, Germany, Document: JVT-AB204 (rev.1), Jul. 2008. available from http://wftp3.itu.int/av-archfivt-site/2008_07_Hannover/JVT-AB204, 73 pp.

Sullivan, et al., JVT-AD007, "Editor's draft revision to ITU-T Rec. H.264, ISO/IEC 14496-10 Advanced Video Coding—in preparation for ITU-T SG 16 AAP Consent (in integrated form)," 30th JVT meeting, Geneva, CH, Feb. 2009, available http://wftp3.itu.int/av-arch/jvt-site/2009_01_Geneva/JVT-AD007.zip., 689 pp.

Laroche G., et al., "RD Optimized Coding for Motion Vector Predictor Selection",IEEE Transaction on Circuits and Systems for Video Technology, IEEE Service Center, Piscataway, NJ, US, vol. 18 (9), Sep. 1, 2008, pp. 1247-1257.

"Text of ISO/IEC FDIS 23002-3 Representation of Auxiliary Video and Supplemental Information," ISO/IEC JTC 1/SC 29/WG 11, MPEG Doc, N81368, Marrakech, Morocoo, Jan. 2007, 27 pp.

Schwarz, et al., "Test Model under Consideration for HEVC based 3D video coding", MPEG Meeting; Nov. 28, 2011-Feb. 12, 2012; Geneva; (Motion Picture Expert Group or ISO/IEC JTC1/SC29/WG11), No. M12350, XP030018845, 42 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Second Written Opinion from International Application No. PCT/US2013/031536, dated Mar. 21, 2014, 10 pp.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, 259 pp.

Bross, et al., "High efficiency video coding (HEVC) text specification draft 7," Joint Collaborative Team on Video Coding (JCT-VC) of ITU-T SG16 WP3 and ISO/IEC JTC1/SC291WG11 9th Meeting: Geneva, CH, Apr. 27,-May 7, 2012, JCTVC-I1003_d2, 290 pp.

Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.

Bross, et al., "High Efficiency Video Coding (HEVC) text specification draft 9," Joint Collaborative Team on Video Coding (JCT-VC) of ITU-T SG16 WP3 and ISO/IEC JTC1/SC291WG11, 11th Meeting: Shanghai, CN, Oct. 10-19, 2012, JCTVC-K1003_v7, pp. 290.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross et al., "WD5: Working Draft 5 of High-Efficiency Video Coding," JCTVC-G1103, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pp.

Bross et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Chen, et al., "AHG10: Hooks related to motion for the 3DV extension of HEVC", JCT-VC Meeting; MPEG Meeting; Jul. 11-20, 2012, Stockholm; (Joint Collaborative Team on Video Coding of ISO/IEC JTC1/SC29/WG11 and ITU-T SG.16); URL: http://wftp3.itu.int/av-arch/jctvc-site/,No. JCTVC-J0122, XP030112484, 20 pp.

Chen, et al., "AHG12: Hooks for temporal motion vector prediction and weighted prediction in HEVC multiview/3DV extension", JCT-VC Meeting; MPEG Meeting; Apr. 27-May 7, 2012; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-10353, XP030112116, 7 pp.

Chen, et al.,"AHG10: Motion related hooks for HEVC multiviewj3DV extension based on long-term reference pictures",

(56) References Cited

OTHER PUBLICATIONS

MPEG Meeting; Jul. 11-20, 2012; Stockholm; (Motion Picture Expert Group or ISO/IEC JTC1/SC29/WG11), No. m25443, XP030053777, 8 pp.

Hannuksela, et al., "AHG21: On reference picture list construction and reference picture marking", JCT-VC Meeting; MPEG Meeting; Nov. 21-30, 2011; Geneva; (Joint Collaborative Team on Video Coding of ISO/IEC JTC1/SC29/WG11 and ITU-T SG:16); URL: http://wftp3.itu.int/av-arch/jctvc-site/, No. JCTVC-G643, XP030110627, 10 pp.

International Search Report and Written Opinion—PCT/US2013/031536, ISA/EPO, Jun. 10, 2013, 16 pp.

Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Jeon, et al., "Non-CE9: simplification of merge/skip TMVP ref_idx derivation," Document: JCTVC-G163, M21716, Joint Collaborative Team on Video Coding (JCT-VC) of ITU-T SG16 WP3 and ISO/IEC JTC1/SC29/WG11, 7th Meeting: Geneva, CH, Nov. 19-30, 2011, 12 pp.

Lin et al: "Improved Advanced Motion Vector Prediction", 95. MPEG Meeting; Jan. 20-28, 2011; Daegu; (Motion Picture Expert Group or ISO/IEC JTC1/SC29/WG11), No. m18877, XP030047446, 8 pp.

Kim, et al: "Restricted usage of motion vectors for long-term reference picture in motion vector prediction process", JCT-VC Meeting; MPEG Meeting; Jul. 11-20, 2012; Stockholm; (Joint Collaborative Team on Video Coding of ISO/IEC JTC1/SC29/WG11 and ITU-T SG.16 ); URL: http://wftp3.itu.int/av-arch/jctvc-site/, No. JCTVC-J0302, XP030112664, 13 pp.

Kim, et al., "Restriction on motion vector scaling for Merge and AMVP", JCT-VC Meeting, MPEG Meeting; Nov. 21-30, 2011; Geneva; (Joint Collaborative Team on Video Coding of ISO/IEC JTC1/SC29/WG11 and ITU-T SG.16); URL: http://wftp3.itu.int/av-arch/jctvc-site/,No. JCTVC-G551, XP030110535, 4 pp.

Li, et al., "High-level Syntax: Marking process for non-TMVP pictures", JCT-VC Meeting; MPEG Meeting; Nov. 21-30, 2011; Geneva; (Joint Collaborative Team on Video Coding of ISO/IEC JTC1/SC29/WG11 and ITU-T SG.16); URL: http://wftp3.itu.int/av-arch/jctvc-site/,No. JCTVC-G398, XP030110382, 3 pp.

Lim, et al., "MVP scaling issue for LTRPs", JCT-VC Meeting; MPEG Meeting; Apr. 27,-May 7, 2012; Geneva; (Joint Collaborative Team on Video Coding-of ISO/IEC JTC1/SC29/WG11 and ITU-T SG.16); URL: http://wftp3.itu.int/av-arch/jctvc-site/, No. JCTVC-I0422, XP030112185, 4 pp.

Nam, et al., "Advanced motion and disparity prediction for 3D video coding", MPEG Meeting; Nov. 28,-Dec. 2, 2011; Geneva; (Motion Picture Expert Group or ISO/IEC JTC1/SC29/WG11), No. m22560, XP030051123, 6 pp.

Ohm, et al., "Work Plan in 3D Standards Development," Document: JCT3V-B1006, Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, 5 pp.

Senoh, et al., "Disparity vector prediction CE plan for MVC/CE4", MPEG Meeting; Apr. 3-7, 2006, Montreux;.(Motion Pictureexpert Group or ISO/IEC JTC1/SC29/WG11), No. M13166, XP030041835, ISSN: 0000-0239, 6 pp.

Lee et al., "Disparity vector prediction in MVC", JVT Meeting; MPEG Meeting; Apr. 21-27, 2007; San Josa CR, US; (Joint Video Team of ISO/IEC JTC1/SC29/WG11 and ITU-T SG.16), No. JVT-W104, XP030007064, ISSN: 0000-0153, 8 pp.

Takahashi, et al., "3D-HEVC-CE3 results on motion parameter prediction by Sony", MPEG Meeting; Feb. 6-10, 2012; San Josa CR; (Motion Picture Expert Group or ISO/IEC JTC1/SC29/WG11), No. m23639, XP030052164, 4 pp.

Takahashi, et al., "Descriptions of 3D Video Coding Proposal (HEVC-Compatible Category) by Sony", MPEG Meeting; Nov. 28,-Dec. 2, 2011, Geneva; (Motion Picture Expert Group or ISO/IEC JTC1/ SC29/WG11), No. m22566, XP030051129, 36 pp.

Takahashi, et al., "High-level Syntax: Motion vector prediction issue for long-term reference picture", JCT-VC Meeting; MPEG Meeting; Jul. 11-20, 2012; Stockholm; (Joint Collaborative Team on Video Coding of ISO/IEC JTC1/SC29/WG11 and ITU-T 5G.16); URL: http://wftp3.itu.int/av-arch/jctvc-site/, No. JCTVC-J0071, XP030112433, 6 pp.

Tech, et al., "MV-HEVC Working Draft 2," Document: JCT3V-B1004_d0, Joint Collaborative Team on 3D Video Coding Extension Development, of ITU-T SG 16 WP 3 and ISO/IEC JTC 1/SC 29/WG 11, 2nd Meeting: Shanghai, CN , Oct. 13-19, 2012, 22 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand et al., "WD1: Working Draft 1 of High-Efficiency Video Coding", JCTVC-C403, 3rd Meeting: Guangzhou, CN, Oct. 7-15, 2010, 137 pp.

Zheng et al., "Extended Motion Vector Prediction for Bi predictive Mode", JCT-VC Meeting; MPEG Meeting; Mar. 16-23, 2011; Geneva; (Joint Collaborative Team on Video Coding of ISO/IEC JTC1/SC29/WG11AND ITU-T SG.16); URL: http://wftp3.itu.int/av-arch/jctvc-site/No. JCTVC-E343, 4 pp.

Zhou, "Non-CE9: Modified H positions for memory bandwidth reduction in TMVP derivation," Document: JCTVC-G082, M21630, Joint Collaborative Team on Video Coding (JCT-VC) of ITU-T SG16 WP3 and ISO/IEC JTC1/SC29/WG11, 7th Meeting: Geneva, CH, Nov. 19-30, 2011, 12 pp.

Jung, et al, "Description of Core Experiment 9: MV Coding and Skip/Merge operations", [online], JCTVC-D609, Retrieved from the internet: <URL:http://phenix.it-sudparis.eu/jct/doc_end_user/documents/4_Daegu/wg11/JCTVC-D609-v3.zip>, Feb. 14, 2011, 11 pp.

Itu-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

MOTION VECTOR CODING AND BI-PREDICTION IN HEVC AND ITS EXTENSIONS

This application claims the benefit of the following U.S. provisional patent applications, the entire contents of each of which are hereby incorporated by reference:

U.S. Provisional Application Ser. No. 61/611,959, filed on Mar. 16, 2012;

U.S. Provisional Application Ser. No. 61/624,990, filed on Apr. 16, 2012;

U.S. Provisional Application Ser. No. 61/658,344, filed Jun. 11, 2012; and

U.S. Provisional Application Ser. No. 61/663,484, filed Jun. 22, 2012.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H0.263, ITU-T H0.264/MPEG-4, Part 10, Advanced Video Coding (AVC), the High Efficiency Video Coding (HEVC) standard presently under development, and extensions of such standards, such as Scalable Video Coding (SVC) and Multiview Video Coding (MVC). Version 6 of the Working Draft (WD) of HEVC is available from http://phenix.int-evry.fr/jct/doc_end_user/documents/8_San%20Jose/wg11/JCTVC-H1003-v21.zip. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding motion vectors and for performing bi-prediction in High Efficiency Video Coding (HEVC) and its extensions, such as multiview or three-dimensional video (3DV) extensions. The techniques of this disclosure may support better forward compatibility to multiview video codec and/or 3D video code in a base codec design.

In one example, a method of decoding video data includes determining a first type for a current motion vector of a current block of video data, determining a second type for a candidate motion vector predictor of a neighboring block to the current block, setting a variable representative of whether the candidate motion vector predictor is available to a value indicating that the candidate motion vector predictor is not available when the first type is different from the second type, and decoding the current motion vector based at least in part on the value of the variable.

In another example, a method of encoding video data includes determining a first type for a current motion vector of a current block of video data, determining a second type for a candidate motion vector predictor of a neighboring block to the current block, setting a variable representative of whether the candidate motion vector predictor is available to a value indicating that the candidate motion vector predictor is not available when the first type is different from the second type, and encoding the current motion vector based at least in part on the value of the variable.

In another example, a device for decoding video data includes a video decoder configured to determine a first type for a current motion vector of a current block of video data, determine a second type for a candidate motion vector predictor of a neighboring block to the current block, set a variable representative of whether the candidate motion vector predictor is available to a value indicating that the candidate motion vector predictor is not available when the first type is different from the second type, and decode the current motion vector based at least in part on the value of the variable.

In another example, a device for encoding video data includes a video encoder configured to determine a first type for a current motion vector of a current block of video data, determine a second type for a candidate motion vector predictor of a neighboring block to the current block, set a variable representative of whether the candidate motion vector predictor is available to a value indicating that the candidate motion vector predictor is not available when the first type is different from the second type, and encode the current motion vector based at least in part on the value of the variable.

In another example, a device for coding devideo data includes means for determining a first type for a current motion vector of a current block of video data, means for determining a second type for a candidate motion vector predictor of a neighboring block to the current block, means for setting a variable representative of whether the candidate motion vector predictor is available to a value indicating that the candidate motion vector predictor is not available when the first type is different from the second type, and means for decoding the current motion vector based at least in part on the value of the variable.

In another example, a device for encoding video data includes means for determining a first type for a current motion vector of a current block of video data, means for determining a second type for a candidate motion vector predictor of a neighboring block to the current block, means for setting a variable representative of whether the candidate motion vector predictor is available to a value indicating that the candidate motion vector predictor is not available when the first type is different from the second type, and means for encoding the current motion vector based at least in part on the value of the variable.

In another example, a computer-readable storage medium (e.g., a non-transitory computer-readable storage medium) has stored thereon instructions that, when executed, cause a processor to determine a first type for a current motion vector of a current block of video data, determine a second type for a candidate motion vector predictor of a neighboring block to the current block, set a variable representative of whether the candidate motion vector predictor is available to a value indicating that the candidate motion vector predictor is not available when the first type is different from the second type, and decode the current motion vector based at least in part on the value of the variable.

In another example, a computer-readable storage medium (e.g., a non-transitory computer-readable storage medium) has stored thereon instructions that, when executed, cause a processor to determine a first type for a current motion vector of a current block of video data, determine a second type for a candidate motion vector predictor of a neighboring block to the current block, set a variable representative of whether the candidate motion vector predictor is available to a value indicating that the candidate motion vector predictor is not available when the first type is different from the second type, and encode the current motion vector based at least in part on the value of the variable.

The details of one or more examples are set forth in the accompanying drawings and the description below. Other features, objects, and advantages will be apparent from the description and drawings, and from the claims.

DETAILED DESCRIPTION

Figure 1:
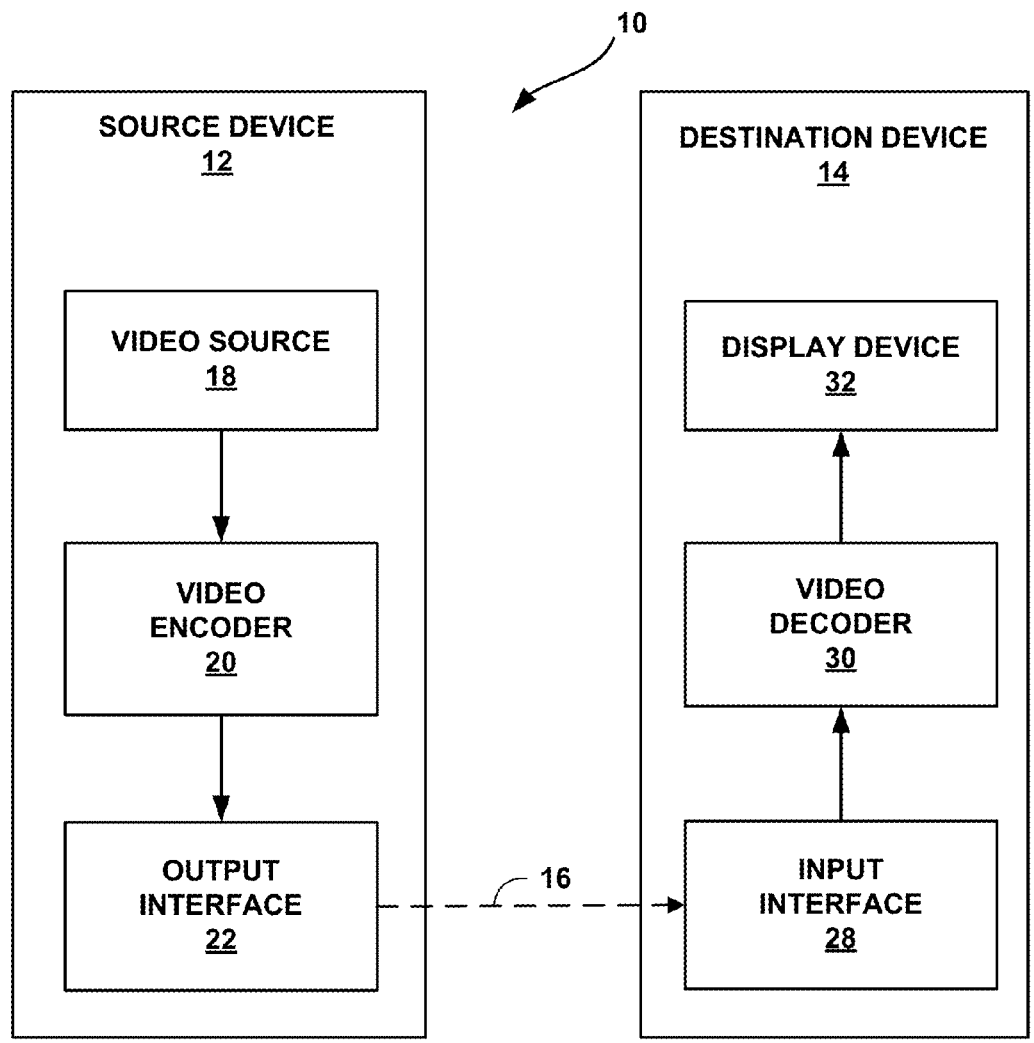
FIG. 1 is a block diagram illustrating an example video encoding and decoding system that may utilize techniques for coding motion vectors and for performing bi-prediction in High Efficiency Video Coding (HEVC) and its extensions, such as multiview or three-dimensional video (3DV) extensions.

In general, this disclosure describes techniques for coding multiview video coding (MVC) data. Currently, the Motion Pictures Experts Group (MPEG) is developing a three-dimensional video (3DV) standard based on the upcoming high efficiency video coding (HEVC) standard. Part of the standardization efforts also includes the standardization of the multiview video codec based on HEVC. In two-dimensional video coding, video data (that is, a sequence of pictures) is coded picture by picture, not necessarily in display order. Video coding devices divide each picture into blocks, and code each block individually. Block-based prediction modes include spatial prediction, also referred to as intra-prediction, and temporal prediction, also referred to as inter-prediction.

For three-dimensional video data, such as HEVC based 3DV, blocks may also be inter-view predicted. That is, blocks may be predicted from a picture of another view, where each view generally corresponds to a respective camera location. In this manner, in HEVC based 3DV, inter-view prediction based on reconstructed view components from different views may be enabled. This disclosure uses the term "view component" to refer to an encoded picture of a particular view. That is, a view component may comprise an encoded picture for a particular view at a particular time (in terms of display order, or output order). A view component (or slices of a view component) may have a picture order count (POC) value, which generally indicates the display order (or output order) of the view component.

In temporal inter-prediction or inter-view prediction, a video coding device may code data indicative of one or more motion vectors (temporal inter-prediction) and/or one or more displacement vectors (inter-view prediction). In some examples, a block coded with one motion vector or one displacement vector is referred to as a P-block, whereas a block coded with two motion vectors or two displacement vectors is referred to as a bi-predictive block, or B-block. Techniques that are applicable to motion vectors are also generally applicable to displacement vectors, and therefore, this disclosure primarily describes motion vector coding techniques. However, it should be understood that such techniques are also applicable to displacement vectors, and likewise, that techniques described with respect to displacement vectors are also applicable to motion vectors, unless otherwise indicated.

Generally, data indicative of reference pictures, to which a motion vector or displacement vector may refer, are stored in reference picture lists. Thus, motion vector data (or displacement vector data) may include not only data for an x-component and a y-component of the motion vector, but also an indication of an entry of the reference picture list, referred to as a reference picture index. Video coding devices may construct multiple reference picture lists. For example, a video coding device may construct a first reference picture list (list 0 or RefPicList0 ) to store data for reference pictures having POC values earlier than a current picture, and a second reference picture list (list 1 or RefPicList1 ) to store data for reference pictures having POC values later than a current picture. Again, it is noted that display or output orders for pictures are not necessarily the same as coding order values (e.g., frame number or "frame_num" values). Thus, pictures may be coded in an order that differs from the order in which the frames are displayed (or captured).

Typically, a reference picture list construction for the first or the second reference picture list of a B picture includes two steps: reference picture list initialization and reference picture list reordering (modification). The reference picture list initialization is an explicit mechanism that puts the reference pictures in the reference picture memory (also known as decoded picture buffer) into a list based on the order of POC (Picture Order Count, aligned with display order of a picture) values. The reference picture list reordering mechanism can modify the position of a picture that was put in the list during the reference picture list initialization to any new position, or put any reference picture in the reference picture memory in any position even the picture doesn't belong to the initialized list. Some pictures after the reference picture list reordering (modification) may be put in a further position in the list. However, if a position of a picture exceeds the number of active reference pictures of the list, the picture is not considered as an entry of the final reference picture list. The number of active reference pictures of maybe signaled in a slice header for each list. After reference picture lists are constructed (e.g., RefPicList0 and RefPicList1, if available), a reference index can be used to identify a picture in any reference picture list.

As noted above, motion vector data may also include a horizontal component (or x-component) and a vertical component (or y-component). Thus, a motion vector may be defined as <x, y>. Rather than coding the x-component and y-component of a motion vector directly, video coding devices may code motion vectors relative to motion vector predictors. Motion vector predictors may be selected from spatial neighbors for a current block, a collocated block of a temporally separate picture (that is, a collocated block in a previously coded picture), or a collocated block of a picture in another view at the same temporal instance, in various examples. Motion vector predictors of a temporally separate picture are referred to as temporal motion vector predictors (TMVPs).

To determine a TMVP for a current block (e.g., a current prediction unit (PU) of a current coding unit (CU) in HEVC), a video coding device may first identify a co-located picture. The term "co-located" picture refers to a picture including a particular co-located block. The co-located block may also be included in a "co-located partition," as indicated in WD6 of HEVC. If the current picture is a B slice, a collocated_from_l0_flag may be signaled in a slice header of a slice of the current picture to indicate whether the co-located picture is from RefPicList0 or RefPicList1. After a reference picture list is identified, the video coding device may use collocated_ref_idx, signaled in the slice header, to identify the co-located picture in the reference picture list. A co-located PU is then identified by checking the co-located picture. Either the motion vector of the right-bottom PU of the CU containing the current PU, or the motion vector of the right-bottom PU within the center PUs of the CU containing this PU, may be treated as the TMVP for the current PU. When motion vectors identified by the above process are used to generate a motion candidate for AMVP or merge mode, they may be scaled based on the temporal location (reflected by POC value of the reference picture). In accordance with the techniques of this disclosure, as described below, a TMVP may be from the same view or from a different view.

In HEVC, the picture parameter set (PPS) includes a flag enable_temporal_mvp_flag. When a particular picture with temporal_id equal to 0 refers to a PPS having enable_temporal_mvp_flag equal to 0, all the reference pictures in the DPB may be marked as "unused for temporal motion vector prediction," and no motion vector from pictures before that particular picture in decoding order would be used as a temporal motion vector predictor in decoding of the particular picture or a picture after the particular picture in decoding order.

In H.264/AVC or HEVC, for P slices, when weighed prediction is allowed, by setting weighted_pred_flag to 1, the prediction weights are explicitly signaled. The syntax element weighted_pred_flag is signaled in slice header and its semantics is as follows:

In some examples, weighted_pred_flag equal to 0 may specify that weighted prediction shall not be applied to P slices. weighted_pred_flag equal to 1 specifies that weighted prediction shall be applied to P slices.

For a B slice, when weighted prediction is enabled, by setting weighted_bipred_idc to be non-zero, the prediction weights may be explicitly signaled or derived implicitly. The syntax may also be signaled in the slice header and its semantics is as follows:

In some examples, weighted_bipred_idc equal to 0 specifies that the default weighted prediction is applied to B slices. In some examples, weighted_bipred_idc equal to 1 specifies that explicit weighted prediction is applied to B slices. In some examples, weighted_bipred_idc equal to 2 specifies that implicit weighted prediction shall be applied to B slices. The value of weighted_bipred_idc may be in the range of 0 to 2, inclusive.

When weighted_bipred_idc is equal to 1, the weights may be derived based on the temporal distance of two reference frames, by calculating the POC distances.

The current HEVC design may impede development of future extensions, such as a multiview or 3DV extension, especially if developers of such extensions want to provide the capability of only making high level syntax changes. For example, if the reference picture to be used for TMVP is from a different view, it may have the same POC as the current picture. The current design of HEVC for motion vector scaling may not be able to accurately identify the reference picture used for TMVP in this scenario. When implicit weighted prediction is applied for B slice and one reference picture is from a different view, the process of calculating the prediction weights may encounter a problem, since the process was designed based on only POC distances.

The techniques of this disclosure may resolve these problems. In general, this disclosure provides techniques for only changing high level syntax on top of HEVC design to support MVC or 3DV. Some of the solutions are for the HEVC base specification, and thus, are for forward compatibility purposes. A video coder, such as a video encoder or video decoder, may be configured to implement any or all of the various techniques of this disclosure, alone or in any combination. Various techniques are described in greater detail below.

As one example, a video coder may be configured to determine a first type for a current motion vector of a current block of video data, determine a second type for a candidate motion vector predictor of a neighboring block to the current block, set a variable representative of whether the candidate motion vector predictor is available to a value indicating that the candidate motion vector predictor is not available when the first type is different from the second type, and code the current motion vector based at least in part on the value of the variable. The different types of motion vectors may comprise, for example, disparity motion vectors and temporal motion vectors.

Any of a variety of techniques may be used to determine a type for a motion vector. For example, a video coder may determine a type for a motion vector (e.g., temporal vs. disparity) based on a comparison of POC values between a current picture and a reference picture to which the motion vector refers. If the POC values are different, then the video coder may determine that the motion vector is a temporal motion vector. On the other hand, if the POC values are the same, the video coder may determine that the motion vector is a disparity motion vector.

As another example, a video coder may compare layers (e.g., views or scalability layers) in which a current picture and a reference picture, to which the motion vector refers, occur. If the current picture and the reference picture occur in the same layer, the video coder may determine that the motion vector is a temporal motion vector. On the other hand, if the current picture and the reference picture occur in different layers, the video coder may determine that the motion vector is a disparity motion vector.

As yet another example, a video coder may determine whether a reference picture to which a motion vector refers is a long-term reference picture or a short-term reference picture. If the reference picture is a short-term reference picture, the video coder may determine that the motion vector is a disparity motion vector. However, if the reference picture is a long-term reference picture, the video coder may determine that the motion vector is a temporal motion vector.

Moreover, in accordance with certain techniques of this disclosure, when a current motion vector is of a different type than a candidate motion vector predictor, a video coder may be configured to determine that the candidate motion vector predictor is not available. For example, the video coder may set an "available" flag (or variable), indicative of whether the candidate motion vector predictor is available for use as a predictor for the current motion vector, to a value indicating that the candidate motion vector predictor is not available when the types are different between the current motion vector and the candidate motion vector predictor.

FIG. 1 is a block diagram illustrating an example video encoding and decoding system 10 that may utilize techniques for coding motion vectors and for performing bi-prediction in HEVC and its extensions, such as multiview or 3DV extensions. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding motion vectors and for performing bi-prediction in HEVC and its extensions, such as multiview or 3DV extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding motion vectors and for performing bi-prediction in HEVC and its extensions, such as multiview or 3DV extensions may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Likewise, video encoder 20 and video decoder 30 may be configured according to an extension of the HEVC standard, e.g., a multiview extension or three-dimensional video (3DV) extension. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursivelGy, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Video encoder 20 and video decoder 30 may be configured to perform one or more of the various techniques of this disclosure, alone or in any combination. For example, in accordance with certain techniques of this disclosure, video encoder 20 and video decoder 30 may be configured to perform various techniques related to multiview video coding (MVC) or three-dimensional video (3DV) coding, e.g., as extensions of H.264/AVC or HEVC. MVC and/or 3DV extensions of video coding standards can be achieved, in some instances, using high level syntax (HLS) changes to the base standard. For example, rather than introducing new coding structures, certain existing coding structures may be redefined or used in a different way to achieve an HLS-only extension.

As an example, to code video data in accordance with MVC and 3DV extensions, video encoder 20 and video decoder 30 may be configured to perform inter-layer or inter-view prediction. That is, video encoder 20 and video decoder 30 may be configured to predict blocks of a current picture in a current view using data of a previously coded picture of a previously coded view. Typically, the previously coded picture (i.e., the inter-view reference picture) and the current picture have the same picture order count (POC) value, such that the inter-view reference picture and the current picture occur in the same access unit, and likewise, have substantially the same output order (or display order).

Video encoder 20 and video decoder 30 may be configured to utilize a disparity motion vector to code a current block of a current picture using inter-view prediction. Thus, in some examples, a disparity motion vector may be said to comprise a motion vector for which a current POC value, for a current picture including a current block predicted using the motion vector, is equal to the POC value of a reference picture referred to by the motion vector. Thus, video encoder 20 and video decoder 30 may be configured to determine that a motion vector is a disparity motion vector when the POC value for the block predicted by the motion vector is equal to the POC value of the reference picture to which the motion vector refers. Similarly, video encoder 20 and video decoder 30 may be configured to determine that a motion vector comprises a temporal motion vector when the POC for the block predicted by the motion vector is not equal to the POC value of the reference picture to which the motion vector refers.

Additionally or alternatively, video encoder 20 and video decoder 30 may be configured to determine that a motion vector comprises a disparity motion vector when a current picture including a current block predicted using the motion vector is in a different layer than a reference picture referred to by the motion vector. Similarly, video encoder 20 and video decoder 30 may be configured to determine that a motion vector comprises a temporal motion vector when a current picture including a current block predicted using the motion vector is in the same layer as a reference picture referred to by the motion vector.

As yet another example, HEVC distinguishes long-term from short-term reference pictures. In the techniques of HEVC, long-term pictures are stored in a decoded picture buffer (DPB) relatively longer than short-term reference pictures. Additionally, syntax elements are used to indicate whether a reference picture is a long-term or a short-term reference picture. In some examples, in MVC and 3DV, long-term reference pictures may instead correspond to temporal reference pictures (i.e., of the same layer or view as a current picture being coded) while short-term reference pictures may instead correspond to inter-view reference pictures (i.e., of a different layer or view as the current picture being coded). Thus, the use of long-term and short-term reference pictures can also provide an indication of whether a reference picture is a temporal reference picture or an inter-view reference picture. Likewise, a motion vector referring to a long-term reference picture may comprise a temporal motion vector, whereas a motion vector referring to a short-term reference picture may comprise a disparity motion vector.

In accordance with certain techniques of this disclosure, video encoder 20 and video decoder 30 may be configured to disable the use of motion vectors of different types as motion vector predictors for each other. For example, if a current motion vector is a temporal motion vector, video encoder 20 and video decoder 30 may be configured to not use disparity motion vectors as motion vector predictors to predict the temporal motion vector. Likewise, if a current motion vector is a disparity motion vector, video encoder 20 and video decoder 30 may be configured to not to use temporal motion vectors as motion vector predictors to predict the disparity motion vector.

Video encoder 20 and video decoder 30 may be configured to perform various modes of motion vector prediction. In one example, merge mode, video encoder 20 and video decoder 30 may be configured to code a merge flag representative of from which of a plurality of neighboring blocks to inherit motion parameters, such as, for example, a reference picture list from which to select a reference picture, a reference index indicative of the reference picture in the reference list, a horizontal motion vector component, and a vertical motion vector component.

In another example, advanced motion vector prediction (AMVP), video encoder 20 and video decoder 30 may be configured to code an indication of a reference picture list from which to select a reference picture, a reference index indicative of a reference picture in the reference picture list, a motion vector difference value, and an AMVP index representative of a neighboring block from which to select a motion vector predictor.

In merge mode and/or AMVP mode, or other such motion vector coding modes, video encoder 20 and video decoder 30 may be configured not to use motion information from a neighboring block that uses a motion vector of a different type than a motion vector of a current block. That is, video encoder 20 and video decoder 30 may be configured to determine a first type for a current motion vector, a second type for a candidate motion vector predictor, and if the first type is not the same as the second type, to disable the use of the candidate motion vector predictor as a motion vector predictor for the current motion vector.

To disable the candidate motion vector predictor, video encoder 20 and video decoder 30 may set a variable representative of whether the candidate motion vector predictor is available for use as a motion vector predictor for the current motion vector. Video encoder 20 and video decoder 30 may set a value for this variable to indicate that the candidate motion vector predictor is not available, even when the candidate motion vector predictor had previously been considered available based on other conditions that indicated that the candidate motion vector predictor was available. For example, as explained in greater detail below, video encoder 20 and video decoder 30 may associate a variable with the candidate motion vector predictor, where the value of the variable indicates whether the candidate motion vector predictor is available for use as a motion vector predictor for the current motion vector.

In particular, video encoder 20 may be configured to determine a set of motion vector predictors that are available for use to predict the current motion vector. Video decoder 30 may also be configured to construct such a set, or alternatively, video encoder 20 may signal the set of motion vector predictors that are available. In any case, video encoder 20 and video decoder 30 may determine a set of available motion vector predictors, and select one of the set of motion vector predictors as the actual motion vector predictor to use to code the current motion vector.

In AMVP mode, video encoder 20 may calculate motion vector difference values between the current motion vector and the motion vector predictor and code the motion vector difference values. Likewise, video decoder 30 may combine the motion vector difference values with the determined motion vector predictor to reconstruct the current motion vector (i.e., a motion vector for a current block of video data, e.g., a current PU). In merge mode, the actual motion vector predictor may be used as the current motion vector. Thus, in merge mode, video encoder 20 and video decoder 30 may treat the motion vector difference values as being zero-valued.

In accordance with certain techniques of this disclosure, video encoder 20 and video decoder 30 may be configured to determine whether one or more candidate motion vector predictors in the list of candidate motion vector predictors (any or all of which may have previously been determined to be available based on other criteria) are unavailable for predicting a current motion vector based on whether the one or more candidate motion vector predictors have different types than the current motion vector. Video encoder 20 and video decoder 30 may further be configured to disable motion vector prediction using those candidate motion vector predictors that are determined to be unavailable, e.g., by setting an available flag (or variable) for the unavailable candidate motion vector predictors to a value indicating that the unavailable candidate motion vector predictors are unavailable.

Additionally or alternatively, after selecting a motion vector predictor from the set of available candidate motion vector predictors, video encoder 20 and video decoder 30 may be configured to determine whether the selected motion vector predictor is a disparity motion vector (that is, whether the selected motion vector predictor refers to an inter-view reference picture). If so, video encoder 20 and video decoder 30 may disable scaling of the motion vector predictor when coding the current motion vector. That is, assuming that the current motion vector and the motion vector predictor are both disparity motion vectors (that is, refer to an inter-view reference picture), the difference in POC values between the current picture and the inter-view reference picture(s) will be zero (because inter-view reference pictures generally occur within the same access unit as the current picture being coded), and therefore, scaling is not necessary. Moreover, attempting to scale the motion vector predictor may cause errors, which can be avoided by disabling scaling, in accordance with the techniques of this disclosure.

In some examples, in MVC or 3DV extension of HEVC, the enable_temporal_mvp_flag is always set to 0 for any active PPS. That is, video encoder 20 may be configured to set the enable_temporal_mvp_flag of an active PPS in an MVC or 3DV extension of HEVC to 0. Likewise, video decoder 30 may be configured to decode enable_temporal_mvp_flag, or to infer a value of 0 for enable_temporal_mvp_flag when decoding a bitstream conforming to the MVC or 3DV extension of HEVC.

In some examples, in MVC or 3DV extension of HEVC, video encoder 20 and video decoder 30 set a value of collocated_ref_idx in a way that the co-located picture never corresponds to a reference picture from a different view, in a profile that has only high level syntax (HLS) changes. Furthermore, video encoder 20 and video decoder 30 may be configured to code data representative of an indication for the MVC or 3DV extension of HEVC to enable a profile which utilizes low level changes to have more flexibility of co-located pictures.

In some examples, video encoder 20 and video decoder 30 may be configured to code data representative of an indication in the slice header of a slice coded according to HEVC, to explicitly disable the scaling of motion vectors of an identified co-located picture during TMVP. Such a co-located picture may be marked as "unused for temporal motion vector prediction."

In some examples, in HEVC, video encoder 20 and video decoder 30 may disable motion vector scaling during advanced motion vector prediction when a motion vector of a neighboring block has a different reference index than a current reference index, and also a different picture order count (POC) value than that of a current reference picture. Video encoder 20 and video decoder 30 may be configured to code data representing indication may in the slice header, adaptation parameter set (APS), picture parameter set (PPS), sequence parameter set (SPS), video parameter set (VPS), or other data structure, to signal whether disabling AMVP is on or off.

In some examples, in HEVC, video encoder 20 and video decoder 30 may determine that a motion vector from a spatially neighboring block as unavailable when one, and only one, of this motion vector and the motion vector to be predicted is from a picture that has the same POC value as the current picture. Such techniques may apply to either or both of AMVP and merge modes. Alternatively, such techniques may apply only to the temporal motion vector prediction (TMVP) aspect of the AMVP and the merge modes. Video encoder 20 and video decoder 30 may code data in the slice header, APS, SPS, PPS, or VPS representing an indication to enable or disable this technique.

In some examples with HEVC, a motion vector for which the reference index points to a picture from a different view/layer may be considered as unavailable for use as a motion vector predictor, when the reference index of the motion vector to be predicted points to a temporal reference picture (from the same view/layer). This may apply to both AMVP and merge modes. Alternatively, this may apply only to the TMVP part of the AMVP and the merge modes.

In some examples, in HEVC, video encoder 20 and video decoder 30 may code data representing an indication for each reference picture set (RPS) subset to signal whether any co-located picture from a specific RPS subset will be used for motion vector scaling when the co-located picture is identified as a co-located picture during TMVP. Each picture in the RPS subset may be marked as "unused for temporal motion vector prediction."

In some examples, in HEVC, video encoder 20 and video decoder 30 may code data representing an indication for each RPS subset to signal whether any spatially neighboring motion vector prediction from a picture in a specific RPS subset will be considered as unavailable during AMVP if this motion vector and the motion vector to be predicted belong to RPS subsets having the same indication.

In some examples, in HEVC, video encoder 20 and video decoder 30 may code data representing a new type of implicit weighted prediction for B slices, such that for certain reference picture pairs in RefPicList0 and RefPicList1, if either of the reference pictures in a pair is used for weighted bi-prediction for a PU, the weights may be the same for both reference pictures. For other combinations of pictures from RefPicList0 and RefPiclist1, the current implicit weighted prediction in HEVC or H.264/AVC may apply. Video encoder 20 and video decoder 30 may code data representing which combinations are enabled or disabled in the slice header.

In some examples, video encoder 20 and video decoder 30 may be configured not to use a disparity motion vector to predict a normal (i.e., temporal) motion vector, and not to use a temporal motion vector to predict a disparity motion vector. Moreover, video encoder 20 and video decoder 30 may be configured not to scale a disparity motion vector. In some examples, when one or two reference pictures of a current PU are inter-view reference pictures, and implicit weighted prediction mode is turned on, the weights for these two reference pictures of the current PU may be set to be the same (e.g., ½, ½).

In some examples, as a derivation of the properties of RPS subsets, for each RPS subset of RefPicSetLtCurr, RefPicSetLtFoll, RefPicSetStCurrBefore, RefPicSetStCurrAfter and RefPicSetStFoll, a video coder may derive a RefTypeIdc to be equal to 0. Each picture included in an RPS subset may have RefPicTypeIdc set equal to RefTypeIdc of the RPS subset. As an example use of this in the potential MVC extension of HEVC, the InterView RPS subset can be set to have RefTypeIdc equal to 1.

This disclosure defines the function RefPicTypeFunc (pic), which returns the RefPicTypeIdc value of the reference picture "pic" passed to the function as an argument. This function may be performed as part of a decoding process, e.g., by video encoder 20 when decoding previously encoded video data for use as reference video data or by video decoder 30 during a video decoding process.

This disclosure also provides techniques for a derivation process for motion vector predictor candidates. A video coder, such as video encoder 20 and video decoder 30, may derive the motion vector mvLXA and the availability flag availableFlagLXA using the following procedure, in addition or as an alternative to the procedures of conventional HEVC. When availableFlagLXA is equal to 0, for $(xA_k, yA_k)$ from $(xA_0, yA_0)$ to $(xA_1, yA_1)$ where $yA_1=yA_0-$MinPuSize, the following may apply repeatedly until availableFlagLXA is equal to 1 (where numbers in the format #-### refer to specific sections of the upcoming HEVC standard, in this example):

If the prediction unit covering luma location (xAk, yAk) is available, PredMode is not MODE_INTRA, predFlagLX[xAk][yAk] is equal to 1, availableFlagLXA is set equal to 1, the motion vector mvLXA is set equal to the motion vector mvLX[xAk][yAk], refIdxA is set equal to refIdxLX[xAk][yAk], ListA is set equal to LX.

Otherwise if the prediction unit covering luma location (xAk, yAk) is available, PredMode is not MODE_INTRA, predFlagLY[xAk][yAk] (with Y=!X) is equal to 1, availableFlagLXA is set equal to 1, the motion vector mvLXA is set equal to the motion vector mvLY[xAk][yAk], refIdxA is set equal to refIdxLY[xAk][yAk], ListA is set equal to LY.

If availableFlagLXA is equal to 1, and RefPicTypeFunc (RefPicListListA(refIdxA)) is not equal to RefPicTypeFunc (RefPicListLX(refIdxLX)), availableFlagLXA is set to 0.

When availableFlagLXA is equal to 1, and RefPicTypeFunc (RefPicListListA(refIdxA)) and RefPicTypeFunc (RefPicListLX(refIdxLX)) are both equal to 0, mvLXA may be derived as specified below:

$$tx=(16384+(\text{Abs}(td)>>1))/td \qquad (8\text{-}136)$$

$$\text{DistScaleFactor}=\text{Clip3}(-4096,4095,(tb*tx+32)>>6) \qquad (8\text{-}137)$$

$$mvLXA=\text{Clip3}(-8192,8191.75,\text{Sign}(\text{DistScaleFactor}*mvLXA)*((\text{Abs}(\text{DistScaleFactor}*mvLXA)+127)>>8)) \qquad (8\text{-}138)$$

where td and tb may be derived as:

$$td=\text{Clip3}(-128,127,\text{PicOrderCntVal}-\text{PicOrderCnt}(\text{RefPicListListA}(\text{refIdx}A))) \qquad (8\text{-}139)$$

$$tb=\text{Clip3}(-128,127,\text{PicOrderCntVal}-\text{PicOrderCnt}(\text{RefPicList}LX(\text{refIdx}LX))) \qquad (8\text{-}140)$$

When availableFlagLXA is equal to 1, and RefPicTypeFunc (RefPicListListA(refIdxA)) and RefPicTypeFunc (RefPicListLX(refIdxLX)) are both equal to a non-zero value, mvLAX is set to mvLXA without scaling.

A video coder, such as video encoder 20 and video decoder 30, may derive motion vector mvLXB and the availability flag availableFlagLXB using the following procedure, in addition to or in the alternative to the procedures of conventional HEVC. When is ScaledFlagLX is equal to 0, availableFlagLXB may be set equal to 0 and for $(xB_k, yB_k)$ from $(xB_0, yB_0)$ to $(xB_2, yB_2)$ where $xB_0=xP+nPSW$, $xB_1=xB_0-\text{MinPuSize}$, and $xB_2=xP-\text{MinPuSize}$, the following may apply repeatedly until availableFlagLXB is equal to 1:

If the prediction unit covering luma location (xBk, yBk) is available, PredMode is not MODE_INTRA, predFlagLX[xBk][yBk] is equal to 1, availableFlagLXB is set equal to 1, the motion vector mvLXB is set equal to the motion vector mvLX[xBk][yBk], refIdxB is set equal to refIdxLX[xBk][yBk], ListB is set equal to LX.

Otherwise if the prediction unit covering luma location (xBk, yBk) is available, PredMode is not MODE_INTRA, predFlagLY[xBk][yBk] (with Y=!X) is equal to 1, availableFlagLXB is set equal to 1, the motion vector mvLXB is set equal to the motion vector mvLY[xBk][yBk], refIdxB is set equal to refIdxLY[xBk][yBk], ListB is set equal to LY.

If availableFlagLXA is equal to 1, and RefPicTypeFunc (RefPicListListB(refIdxB)) is not equal to RefPicTypeFunc (RefPicListLX(refIdxLX)), availableFlagLXB is set to 0.

When availableFlagLXB is equal to 1 and RefPicType-Func (RefPicListListA(refIdxA)) and RefPicTypeFunc (RefPicListLX(refIdxLX)) are both equal to 0, and PicOrderCnt(RefPicListListB(refIdxB)) is not equal to PicOrderCnt(RefPicListLX(refIdxLX)), mvLXB is derived as specified below.

$$tx=(16384+(Abs(td)>>1))/td \qquad (8\text{-}144)$$

$$DistScaleFactor=Clip3(-4096,4095,(tb*tx+32)>>6) \qquad (8\text{-}145)$$

$$\begin{aligned}mvLXB=&Clip3(-8192,8191.75,Sign\\&(DistScaleFactor*mvLXA)*((Abs\\&(DistScaleFactor*mvLXA)+127)>>8))\end{aligned} \qquad (8\text{-}146)$$

where td and tb may be derived as $$td=Clip3(-128,127,PicOrderCntVal-PicOrderCnt\\(RefPicListListB(refIdxB))) \qquad (8\text{-}147)$$

$$tb=Clip3(-128,127,PicOrderCntVal-PicOrderCnt\\(RefPicListLX(refIdxLX))) \qquad (8\text{-}148)$$

When availableFlagLXB is equal to 1, and RefPicType-Func (RefPicListListB(refIdxB)) and RefPicTypeFunc (RefPicListLX(refIdxLX)) are both equal to a non-zero value, mvLAX is set to mvLXA without scaling.

A video coder, such as video encoder 20 and video decoder 30, may derive a temporal luma motion vector predictor in accordance with techniques of this disclosure. For example, the video coder may derive the variables mvLXCol and availableFlagLXCol as follows:

If one of the following conditions is true, both components of mvLXCol may be set equal to 0 and availableFlagLXCol may be set equal to 0:
  colPu is coded in an intra prediction mode.
  colPu is marked as "unavailable".
  colPic is marked as "unused for temporal motion vector prediction".
  enable_temporal_mvp_flag is equal to 0.
Otherwise, the motion vector mvCol, the reference index refIdxCol, and the reference list identifier listCol may be derived as follows.
  If PredFlagL0 [xPCol][yPCol] is equal to 0, mvCol, refIdxCol, and listCol may be set equal to MvL1 [xPCol][yPCol], RefIdxL1 [xPCol][yPCol], and L1, respectively.
  Otherwise (PredFlagL0 [xPCol][yPCol] is equal to 1), the following may apply:
    If PredFlagL1 [xPCol][yPCol] is equal to 0, mvCol, refIdxCol, and listCol may be set equal to MvL0 [xPCol][yPCol], RefIdxL0 [xPCol][yPCol], and L0, respectively.
    Otherwise (PredFlagL1 [xPCol][yPCol] is equal to 1), the following assignments may be made.
      If PicOrderCnt(pic) of every picture pic in every reference picture lists is less than or equal to PicOrderCntVal, mvCol, refIdxCol, and listCol may be set equal to MvLX[xPCol][yPCol], RefIdxLX[xPCol][yPCol] and LX, respectively with X being the value of X this process is invoked for.
      Otherwise (PicOrderCnt(pic) of at least one picture pic in at least one reference picture list is greater than PicOrderCntVal, mvCol, refIdxCol and listCol may be set equal to MvLN[xPCol][yPCol], RefIdxLN[xPCol][yPCol] and LN, respectively, with N being the value of collocated_from_l0_flag.

and the variable availableFlagLXCol may be set equal to 1 and the following may apply:
  If RefPicTypeFunc(RefPicListLX (refIdxLX)) is not equal to RefPicTypeFunc(listCol(refIdxCol)), availableFlagLXCol is set equal to 0. Note that listCol(refIdxCol) returns the reference picture of the temporal motion vector.
  If availableFlagLXCol is 1 and RefPicTypeFunc (RefPicListLX(refIdxLX)) and RefPicTypeFunc (listCol (refIdxCol)) are both equal to a non-zero value, or PicOrderCnt(colPic)−RefPicOrderCnt(colPic, refIdxCol, listCol) is equal to PicOrderCntVal−PicOrderCnt(RefPicListLX(refIdxLX)), $$mvLXCol=mvCol \qquad (8\text{-}153)$$

Otherwise, if RefPicTypeFunc(RefPicListLX(refIdxLX)) and RefPicTypeFunc(listCol(refIdxCol)) are both equal to 0, mvLXCol may be derived as scaled version of the motion vector mvCol as specified below:

$$tx=(16384+(Abs(td)>>1))/td \qquad (8\text{-}154)$$

$$DistScaleFactor=Clip3(-4096,4095,(tb*tx+32)>>6) \qquad (8\text{-}155)$$

$$\begin{aligned}mvLXCol=&Clip3(-8192,8191.75,Sign\\&(DistScaleFactor*mvCol)*((Abs\\&(DistScaleFactor*mvCol)+127)>>8))\end{aligned} \qquad (8\text{-}156)$$

where td and tb may be derived as:

$$td=Clip3(-128,127,PicOrderCnt(colPic)-RefPicOrderCnt(colPic,refIdxCol,listCol)) \qquad (8\text{-}157)$$

$$tb=Clip3(-128,127,PicOrderCntVal-PicOrderCnt\\(RefPicListLX(refIdxLX))) \qquad (8\text{-}158)$$

The variables described herein may be derived for implicit weighted prediction.

This disclosure also provides techniques for a weighted sample prediction process, which video encoder 20 and video decoder 30 may be configured to perform. Inputs to the process may include:
  a location (xB, yB) specifying the top-left sample of the current prediction unit relative to the top left sample of the current coding unit,
  the width and height of this prediction unit, nPSW and nPSH,
  two (nPSW)x(nPSH) arrays predSamplesL0 and predSamplesL1,
  prediction list utilization flags, predFlagL0 and predFlagL1,
  reference indices, refIdxL0 and refIdxL1,
  motion vectors, mvL0 and mvL1,
  the bit-depth of the chroma component, bitDepth.
Outputs of this process may include:
  the (nPSW)x(nPSH) array predSamples of prediction sample values.
In one example, variables shift1, shift2, offset1, and offset2 are derived as follows:
  The variable shift1 is set equal to 14−bitDepth and the variable shift2 is set equal to 15−bitDepth,
  The variable offset1 is set equal to 1<<(shift1−1) and the variable offset2 is set equal to 1<<(shift2−1).
In P slices, if the value of predFlagL0 is equal to 1, the following may apply:
  If weighted_pred_flag is equal to 0, the default weighted sample prediction process as described in subclause 8.5.2.2.3.1 is invoked with the same inputs and outputs as the process described in this subclause.

Otherwise (weighted_pred_flag is equal to 1), the explicit weighted sample prediction process as described in subclause 8.5.2.2.3.2 is invoked with the same inputs and outputs as the process described in this subclause.

In B slices, if predFlagL0 or predFlagL1 is equal to 1, the following may apply:

If weighted_bipred_idc is equal to 0, the default weighted sample prediction process as described in subclause 8.5.2.2.3.1 is invoked with the same inputs and outputs as the process described in this subclause.

Otherwise, if weighted_bipred_idc is equal to 1 and if predFlagL0 or predFlagL1 equal to 1, the explicit weighted sample prediction process as described in subclause 8.5.2.2.3.2 is invoked with the same inputs and outputs as the process described in this subclause.

Otherwise (weighted_bipred_idc is equal to 2), the following may apply:

If predFlagL0 is equal to 1 and predFlagL1 is equal to 1, and both RefPicTypeFunc(RefPicListL0(refIdxL0)) and RefPicTypeFunc(RefPicListL1(refIdxL1)) are equal to 0, the implicit weighted sample prediction process as described in subclause 8.5.2.2.3.2 of the current HEVC working draft is invoked with the same inputs and outputs as the process described in this subclause.

Otherwise (predFlagL0 or predFlagL1 are equal to 1 but not both), the default weighted sample prediction process as described in subclause 8.5.2.2.3.1 is invoked with the same inputs and outputs as the process described in this subclause.

This disclosure also provides techniques for a default weighted sample prediction process. Inputs to this process, and outputs from this process, may be the same as described above for the weighted sample prediction process. Depending on the value of predFlagL0 and predFlagL1, the prediction samples predSamples[x, y] with x=0 . . . (nPSW)−1 and y=0 . . . (nPSH)−1 may be derived as follows:

If predFlagL0 is equal to 1 and predFlagL1 is equal to 0, $$predSamples[x,y]=Clip3\ (0,(1<<bitDepth)-1,(predSamplesL0[x,y]+offset1)>>shift1) \quad (8\text{-}211)$$

Otherwise, if predFlagL0 is equal to 0 and predFlagL1 is equal to 1, $$predSamples[x,y]=Clip3(0,(1<<bitDepth)-1,(predSamplesL1[x,y]+offset1)>>shift1) \quad (8\text{-}212)$$

Otherwise (both predFlagL0 and predFlagL1 are equal to 1), if RefPicOrderCnt(currPic, refIdxL0, L0) is equal to RefPicOrderCnt(currPic, refIdxL1, L1) and mvL0 is equal to mvL1 and both RefPicTypeFunc(RefPicListL0 (refIdxL0)) and RefPicTypeFunc(RefPicListL1(refIdxL1)) are equal to 0, $$predSamples[x,y]=Clip3(0,(1<<bitDepth)-1,(predSamplesL0[x,y]+offset1)>>shift1) \quad (8\text{-}213)$$

Otherwise, $$predSamples[x,y]=Clip3(0,(1<<bitDepth)-1,(predSamplesL0[x,y]+predSamplesL1[x,y]+offset2)>>shift2) \quad (8\text{-}214)$$

In another example, weighted prediction may be performed as follows. A new type of implicit weighting may be performed, which may correspond to the modified implicit weighted prediction. The following changes may be made in the picture parameter set RBSP semantics:

weighted_bipred_idc equal to 0 may specify that default weighted prediction is applied to B slices. weighted_bipred_idc equal to 1 may specify that explicit weighted prediction is applied to B slices. weighted_bipred_idc equal to 2 may specify that implicit weighted prediction shall be applied to B slices. weighted_bipred_idc equal to 3 may specify that constrained implicit weighted prediction is applied to B slices. The value of weighted_bipred_idc may be in the range of 0 to 3, inclusive.

In some examples, the techniques of this disclosure may include the following weighted sample prediction process, e.g., performed during a decoding process. Inputs to the weighted sample prediction process may include:

a location (xB, yB) specifying the top-left sample of the current prediction unit relative to the top left sample of the current coding unit, the width and height of this prediction unit, nPSW and nPSH, two (nPSW)x(nPSH) arrays predSamplesL0 and predSamplesL1, prediction list utilization flags, predFlagL0 and predFlagL1, reference indices, refIdxL0 and refIdxL1, motion vectors, mvL0 and mvL1, the bit-depth of the chroma component, bitDepth.

Outputs of this process may include:

the (nPSW)x(nPSH) array predSamples of prediction sample values.

Variables shift1, shift2, offset1 and offset2 may be derived as follows:

The variable shift1 is set equal to 14−bitDepth and the variable shift2 is set equal to 15−bitDepth, The variable offset1 is set equal to 1<<(shift1−1) and the variable offset2 is set equal to 1<<(shift2−1).

In P slices, if the value of predFlagL0 is equal to 1, the following may apply:

If weighted_pred_flag is equal to 0, the default weighted sample prediction process as described in subclause 8.5.2.2.3.1 of the current HEVC working draft may be invoked with the same inputs and outputs as the process described in this subclause, e.g., subclause 4.2.2.

Otherwise (weighted_pred_flag is equal to 1), the explicit weighted sample prediction process as described in subclause 8.5.2.2.3.2 of the current HEVC working draft may be invoked with the same inputs and outputs as the process described in this subclause, e.g., subclause 4.2.2.

In B slices, if predFlagL0 or predFlagL1 is equal to 1, the following may apply:

If weighted_bipred_idc is equal to 0, the default weighted sample prediction process as described in subclause 8.5.2.2.3.1 of the current HEVC working draft may be invoked with the same inputs and outputs as the process described in this subclause, e.g., subclause 4.2.2.

Otherwise, if weighted_bipred_idc is equal to 1 and if predFlagL0 or predFlagL1 equal to 1, the explicit weighted sample prediction process as described in subclause 8.5.2.2.3.2 of the current HEVC working draft may be invoked with the same inputs and outputs as the process described in this subclause, e.g., subclause 4.2.2.

Otherwise if weighted_bipred_idc is equal to 2, the following may apply:

If predFlagL0 is equal to 1 and predFlagL1 is equal to 1, the implicit weighted sample prediction process as described in subclause 8.5.2.2.3.2 of the current HEVC working draft may be invoked with the same inputs and outputs as the process described in this subclause, e.g., subclause 4.2.2.

Otherwise (predFlagL0 or predFlagL1 are equal to 1 but not both), the default weighted sample prediction process as described in subclause 8.5.2.2.3.1 of the current HEVC working draft may be invoked with the same inputs and outputs as the process described in this subclause, e.g., subclause 4.2.2.

Otherwise (weighted_bipred_idc is equal to 3), the following may apply:

If predFlagL0 is equal to 1 and predFlagL1 is equal to 1, and both RefPicTypeFunc(RefPicListL0(refIdxL0)) and RefPicTypeFunc(RefPicListL1(refIdxL1)) are equal to 0, the implicit weighted sample prediction process as described in subclause 8.5.2.2.3.2 of the current HEVC working draft may be invoked with the same inputs and outputs as the process described in this subclause, e.g., subclause 4.2.2.

Otherwise (predFlagL0 or predFlagL1 is equal to 1 but not both are equal to 1), the default weighted sample prediction process as described in subclause 8.5.2.2.3.1 of the current HEVC working draft may be invoked with the same inputs and outputs as the process described in this subclause, e.g., subclause 4.2.2.

In some examples, video encoder 20 and video decoder 30 may be configured to code a flag to disable the scaling of spatially neighboring blocks being scaled for AMVP. Table 1 below provides an example sequence parameter set RBSP syntax for this flag:

TABLE 1

| seq_parameter_set_rbsp( ) { | Descriptor |
|---|---|
| profile_idc | u(8) |
| reserved_zero_8bits /* equal to 0 */ | u(8) |
| level_idc | u(8) |
| seq_parameter_set_id | ue(v) |
| ... | |
| disable_spatial_mv_poc_scaling_flag | u(1) |
| ... | |

In general, the semantics of the sequence parameter set of Table 2 remain the same as for the current HEVC working draft. However, Table 2 introduces a disable spatial MV POC scaling flag. Various examples of semantics for this addition are provided below:

In this example, disable_spatial_mv_poc_scaling_flag equal to 0 indicates that the spatial motion vector is to be scaled based on POC when the target motion vector corresponds to a picture with a different reference index or different POC. In this example, disable_spatial_mv_poc_scaling_flag equal to 1 indicates that the spatial motion vector is considered as unavailable when the reference index of this motion vector is different from a target motion vector. Note that a target motion vector is the motion vector to be predicted under AMVP.

Alternatively, disable_spatial_mv_poc_scaling_flag equal to 1 may indicate that the spatial motion vector is considered as unavailable when the reference index of this motion vector is different from that of a target motion vector and the POC of the reference picture of this motion vector is different from that of a target motion vector.

Alternatively, the disable_spatial_mv_poc_scaling_flag may be added in PPS, APS, or slice header to indicate the same functionality for pictures to which the specific PPS, APS, or slice header can be applicable.

In yet another example, video encoder 20 and video decoder 30 may be configured to code a flag in the SPS under the multiview or 3DV context to disable using of inter-view motion vector (e.g., disparity motion vector) for temporal motion vector prediction (TMVP). Table 2 below provides an example sequence parameter set raw byte sequence payload (RBSP) syntax consistent with certain techniques of this disclosure:

TABLE 2

| seq_parameter_set_rbsp( ) { | Descriptor |
|---|---|
| profile_idc | u(8) |
| reserved_zero_8bits /* equal to 0 */ | u(8) |
| level_idc | u(8) |
| seq_parameter_set_id | ue(v) |
| ... | |
| bit_equal_one | u(1) |
| ... | |
| disable_inter_view_as_tmvp_flag | u(1) |
| ... | |
| if( sps_extension_flag2 ) | |
|    while( more_rbsp_data( ) ) | |
|       sps_extension_data_flag2 | u(1) |
| rbsp_trailing_bits( ) | |
| } | |

In general, the semantics of the sequence parameter set of Table 2 remain the same as for the current HEVC working draft. However, Table 2 introduces bit_equal_one, disable_inter_view_as_tmvp_flag, sps_extension_flag, and sps_extension_data_flag2. Example semantics for these additions are provided below:

In this example, disable_inter_view_as_tmvp_flag equal to 1 indicates that for all slices in the coded video sequence, an inter-view (only) reference picture is never chosen as the co-located picture of the TMVP mode. Note that this implies the constraint for collocated_ref_idx (that is, collocated_ref_idx may be set in a way that the co-located picture never corresponds to a reference picture from a different view).

In this example, disable_inter_view_as_tmvp_flag equal to 0 indicates that an inter-view (only) reference picture may be chosen as the co-located picture of the TMVP mode.

In some examples, a sequence parameter set may include the elements of either or both of Tables 1 and 2 described above, in addition to or in the alternative to any of the elements of the current HEVC working draft.

The current syntax may be signaled as part of the extension bits for the MVC/3DV extension. Alternatively, the syntax element may be signaled in other places that may contain the sequence level information for the multiview/3DV sequence, such as subset sequence parameter set (SPS), or even potentially higher level syntax table, such as video parameter set. Alternatively, the above syntax element (disable_inter_view_as_tmvp_flag) might not be signaled, but the bitstream may always conform to the case when disable_inter_view_as_tmvp_flag is equal to 1. This can be realized by choosing collocated_ref_idx in a way that it never corresponds to an inter-view reference picture.

In addition, picture parameter set (PPS) syntax may be modified in accordance with the techniques of this disclosure. For example, a syntax element "weighted_bipred_idc" may be signaled in the PPS. The semantics for this syntax element may be as follows: weighted_bipred_idc equal to 0 may specify that the default weighted prediction is applied to B slices. weighted_bipred_idc equal to 1 may specify that explicit weighted prediction is applied to B slices. weighted_bipred_idc equal to 2 may specify that implicit weighted prediction shall be applied to B slices. weighted_bipred_idc equal to 3 may specify that constrained implicit weighted prediction is applied to be applied to B slices. The value of weighted_bipred_idc may be in the range of 0 to 3, inclusive.

Table 3 below provides an example syntax table for a slice header consistent with certain techniques of this disclosure:

TABLE 3

| slice_header( ) { | Descriptor |
|---|---|
|    first_slice_in_pic_flag | u(1) |
|    if( first_slice_in_pic_flag = = 0 ) | |
|       slice_address | u(v) |
|    slice_type | ue(v) |
|    entropy_slice_flag | u(1) |
|    if( !entropy_slice_flag ) { | |
|       pic_parameter_set_id | ue(v) |
|       if( output_flag_present_flag ) | |
|          pic_output_flag | u(1) |
|       if( separate_colour_plane_flag = = 1 ) | |
|          colour_plane_id | u(2) |
|       if( IdrPicFlag ) { | |
|          idr_pic_id | ue(v) |
|          no_output_of_prior_pics_flag | u(1) |
|       } else { | |
|          pic_order_cnt_lsb | u(v) |
|          short_term_ref_pic_set_sps_flag | u(1) |
|          if( !short_term_ref_pic_set_sps_flag ) | |
|             short_term_ref_pic_set( num_short_term_ref_pic_sets ) | |
|          else | |
|             short_term_ref_pic_set_idx | u(v) |
|          if( long_term_ref_pics_present_flag ) { | |
|             num_long_term_pics | ue(v) |
|             for( i = 0; i < num_long_term_pics; i++ ) { | |
|                delta_poc_lsb_lt[ i ] | ue(v) |
|                delta_poc_msb_present_flag[ i ] | u(1) |
|                if( delta_poc_msb_present_flag[ i ] ) | |
|                   delta_poc_msb_cycle_lt_minus1[ i ] | ue(v) |
|                used_by_curr_pic_lt_flag[ i ] | u(1) |
|             } | |
|          } | |
|       } | |
|       if( sample_adaptive_offset_enabled_flag ) { | |
|          slice_sao_interleaving_flag | u(1) |
|          slice_sample_adaptive_offset_flag | u(1) |
|          if( slice_sao_interleaving_flag && | |
|             slice_sample_adaptive_offset_flag ) { | |
|             sao_cb_enable_flag | u(1) |
|             sao_cr_enable_flag | u(1) |
|          } | |
|       } | |
|       if( scaling_list_enable_flag | | | |
|          deblocking_filter_in_aps_enabled_flag | | | |
|          ( sample_adaptive_offset_enabled_flag && !slice_sao_interleaving_flag ) | | | |
|          adaptive_loop_filter_enabled_flag ) | |
|          aps_id | ue(v) |
|       if( slice_type = = P | | slice_type = = B ) { | |
|          num_ref_idx_active_override_flag | u(1) |
|          if( num_ref_idx_active_override_flag ) { | |
|             num_ref_idx_l0_active_minus1 | ue(v) |
|             if( slice_type = = B ) | |
|                num_ref_idx_l1_active_minus1 | ue(v) |
|          } | |
|       } | |
|       if( lists_modification_present_flag ) { | |
|          ref_pic_list_modification( ) | |
|          ref_pic_list_combination( ) | |
|       } | |
|       if( slice_type = = B ) | |
|          mvd_l1_zero_flag | u(1) |
|    } | |
|    if( cabac_init_present_flag && slice_type != I ) | |
|       cabac_init_flag | u(1) |
|    if( !entropy_slice_flag ) { | |
|       slice_qp_delta | se(v) |
|       if( deblocking_filter_control_present_flag ) { | |
|          if( deblocking_filter_in_aps_enabled_flag ) | |
|             inherit_dbl_params_from_aps_flag | u(1) |

TABLE 3-continued

| slice_header( ) { | Descriptor |
|---|---|
|       if( !inherit_dbl_params_from_aps_flag ) { | |
|          disable_deblocking_filter_flag | u(1) |
|          if( !disable_deblocking_filter_flag ) { | |
|             beta_offset_div2 | se(v) |
|             tc_offset_div2 | se(v) |
|          } | |
|       } | |
|   } | |
|   if( slice_type = = B ) | |
|     collocated_from_l0_flag | u(1) |
|   if( slice_type != I && | |
|     ((collocated_from_l0_flag &&  num_ref_idx_l0_active_minus1 > 0) | | | |
|     (!collocated_from_l0_flag && num_ref_idx_l1_active_minus1 > 0) ) | |
|     collocated_ref_idx | ue(v) |
|   if (slice_type != I ) | |
|     poc_scaling_tmvp_disabled_flag | u(1) |
|   if( ( weighted_pred_flag && slice_type = = P) | | | |
|     ( weighted_bipred_idc = = 1 && slice_type = = B ) ) | |
|     pred_weight_table( ) | |
|   if ( weighted_bipred_idc = = 3 && slice_type = = B ) | |
|     contrain_implicit_table( ) | |
| } | |
| if( slice_type = = P | | slice_type = = B ) | |
|   five_minus_max_num_merge_cand | ue(v) |
| if( adaptive_loop_filter_enabled_flag ) { | |
|   slice_adaptive_loop_filter_flag | u(1) |
|   if( slice_adaptive_loop_filter_flag && alf_coef_in_slice_flag ) | |
|     alf_param( ) | |
|   if( slice_adaptive_loop_filter_flag && !alf_coef_in_slice_flag ) | |
|     alf_cu_control_param( ) | |
| } | |
| if( seq_loop_filter_across_slices_enabled_flag && | |
|   ( slice_adaptive_loop_filter_flag | | slice_sample_adaptive_offset_flag | | | |
|   !disable_deblocking_filter_flag ) ) | |
|   slice_loop_filter_across_slices_enabled_flag | u(1) |
| if( tiles_or_entropy_coding_sync_idc > 0 ) { | |
|   num_entry_point_offsets | ue(v) |
|   if( num_entry_point_offsets > 0 ) { | |
|     offset_len_minus1 | ue(v) |
|     for( i = 0; i < num_entry_point_offsets; i++ ) | |
|       entry_point_offset[ i ] | u(v) |
|   } | |
| } | |
| } | |

In general, the semantics of the slice header of Table 3 remain the same as for HEVC. However, Table 3 introduces poc_sacling_tmvp_disabled flag and constrain implicit table. Semantics for these additions are provided below (where examples of constrain implicit table are described with respect to Tables 4 and 5 below):

poc_scaling_tmvp_disabled_flag equal to 1 may indicate that the motion vectors derived from TMVP are not scaled. This flag equal to 0 may indicate that the motion vectors derived from TMVP may be scaled as in the current design of TMVP.

As noted above, the slice header may include a constrain implicit table, e.g., in accordance with Table 4 or Table 5 below.

TABLE 4

| const_implicit_table( ) { | Descriptor |
|---|---|
|   for( i = 0; i <= num_ref_idx_lc_active_minus1 ; i++ ) | |
|     implicit_disabled_pic_flag[ i ] | u(1) |
| } | |

Table 5 provides an alternative example of a constrain implicit table:

TABLE 5

| const_implicit_table( ) { | Descriptor |
|---|---|
|   for( i = 0; i <= num_ref_idx_l0_active_minus1; i++ ) | |
|     implicit_disabled_pic_l0_flag[ i ] | u(1) |
|   for( i = 0; i <= num_ref_idx_l1_active_minus1; i++ ) | |
|     implicit_disabled_pic_l1_flag[ i ] | |
| } | |

The semantics of the syntax elements in Tables 4 and 5 are provided below:

implicit_disabled_pic_flag[i] equal to 1 may indicate that, in implicit weighted prediction, if the reference picture corresponding to reference index i in the combined reference picture list is used, the weights for this reference picture and the other reference picture during the implicit weighted prediction are both set to 0.5, meaning no weighted prediction.

implicit_disabled_pic_l0_flag[i] equal to 1 may indicate that, in implicit weighted prediction, if the reference picture corresponding to reference index i in RefPicLisT0 is used, the weights for this reference picture and the other reference picture during the implicit weighted prediction are both set to 0.5, meaning no weighted prediction.

implicit_disabled_pic_l1_flag[i] equal to 1 may indicate that, in implicit weighted prediction, if the reference picture corresponding to reference index i in RefPicListT1 is used, the weights for this reference picture and the other reference picture picture during weighted prediction are both set to 0.5, meaning no weighted prediction.

Alternatively, the reference index values of pictures that will be constrained from implicit weighted prediction can be directly signaled.

Alternatively, as part of the RPS signaling, pictures that will be constrained from implicit weighted prediction can be directly signaled.

Alternatively, in an MVC or 3DV codec, the RPS subset containing the inter-view (only) reference pictures may always be set as constrained implicit weighted prediction pictures.

A constrained implicit weighted prediction picture is a picture such that, when used for implicit prediction, the weights of this picture and the other picture of the bi-prediction pair are both 0.5.

Alternatively, video encoder 20 and video decoder 30 may be configured to code in the PPS or SPS, or slice header for each RPS subset, a flag indicating whether all pictures in the RPS subset are constrained implicit weighted prediction pictures.

As another example, video encoder 20 and video decoder 30 may be configured to code refPicType in the SPS. Table 6 provides an example set of syntax for such an SPS:

TABLE 6

| seq_parameter_set_rbsp( ) { | Descriptor |
|---|---|
| profile_idc | u(8) |
| reserved_zero_8bits /* equal to 0 */ | u(8) |
| level_idc | u(8) |
| seq_parameter_set_id | ue(v) |
| ... | |
| numAdditionalRPSSubSets | ue(v) |
| for ( i = 0; i < numAdditionalRPSSubSets; i++ ) | |
|     ref_type_flag[i] | u(1) |
| ... | |
| rbsp_trailing_bits( ) | |
| } | |

In general, the semantics of the sequence parameter set of Table 6 remain the same as for the current HEVC working draft. However, Table 6 introduces numAdditionalRPSSub-Sets, and ref_type_flag[i] within a for( ) loop. Example semantics for these additions are provided below:

In this example, numAdditionalRPSSubSets specifies the additional RPS subsets besides the RPS susbests of the short-term reference pictures and RPS subsets of the long-term reference pictures.

In this example, ref_type_flag[i] specifies a flag for any picture of the additional RPS subset i. For the RPS subsets containing short-term reference pictures and RPS subsets containing long-term reference pictures, this flag may be inferred to be equal to 0.

RefTypeIdc may be set to ref_type_flag for an RPS subset.

Alternatively, video encoder 20 and video decoder 30 need not code this flag, and may infer a value of 1 for this flag, for inter-view RPS subsets.

Alternatively, video encoder 20 and video decoder 30 may derive the value of RefTypeIdc of a reference picture to be 1 if the reference picture of the motion vector has the same POC as the current picture, and otherwise to be 0.

Other examples may be similar to the first example above (or other examples), with the following additions. In the example below, RefPicTypeFuncMV(mv) returns 0 if the reference index of the motion vector mv points to a temporal reference picture and returns 1 if the reference index of the motion vector mv points to a picture in a different view/layer. Alternatively, RefPicTypeFunc(pic) returns 0 if pic is a short-term reference picture, and returns 1 if pic is a long-term picture. RefPicTypeFuncMV(mv) returns 0 if the reference index of the motion vector mv points to a short-term reference picture and returns 1 if the reference index of the motion vector mv points to a long-term reference picture. Additionally the following processes are modified for AMVP.

Derivation process for luma motion vector prediction

Inputs to this process are a luma location (xP, yP) specifying the top-left luma sample of the current prediction unit relative to the top-left sample of the current picture, variables specifying the width and the height of the prediction unit for luma, nPSW and nPSH.

the reference index of the current prediction unit partition refIdxLX (with X being 0 or 1).

Output of this process is the prediction mvpLX of the motion vector mvLX (with X being 0 or 1).

The motion vector predictor mvpLX is derived in the following ordered steps.

1. The derivation process for motion vector predictor candidates from neighboring prediction unit partitions in subclause 8.5.2.1.6 is invoked with luma location (xP, yP), the width and the height of the prediction unit nPSW and nPSH, and refIdxLX (with X being 0 or 1, respectively) as inputs and the availability flags availableFlagLXN and the motion vectors mvLXN with N being replaced by A, B as the output.

2. If RefPicTypeFuncMV(mvLXA) is not equal to RefPicTypeFuncMV(mvpLX)), availableFlagLXA is set equal to 0, If RefPicTypeFuncMV(mvLXB) is not equal to RefPicTypeFuncMV(mvpLX)), availableFlagLXB is set equal to 0.

3. If both availableFlagLXA and availableFlagLXB are equal to 1 and mvLXA is not equal to mvLXB, availableFlagLXCol is set equal to 0, otherwise, the derivation process for temporal luma motion vector prediction in subclause 5 is invoked with luma location (xP, yP), the width and the height of the prediction unit nPSW and nPSH, and refIdxLX (with X being 0 or 1, respectively) as the inputs and with the output being the availability flag availableFlagLXCol and the temporal motion vector predictor mvLXCol.

4. The motion vector predictor candidate list, mvpListLX, is constructed as follows.
    1. mvLXA, if availableFlagLXA is equal to 1
    2. mvLXB, if availableFlagLXB is equal to 1
    3. mvLXCol, if availableFlagLXCol is equal to 1

5. When mvLXA and mvLXB have the same value, mvLXB is removed from the list. The variable numMVPCandLX is set to the number of elements within the mvpListLX and maxNumMVPCand is set to 2.

6. The motion vector predictor list is modified as follows.

If numMVPCandLX is less than 2, the following applies.

mvpListLX[numMVPCandLX][0]=0    (8-133)

mvpListLX[numMVPCandLX][1]=0    (8-134)

numMVPCandLX=numMVPCandLX+1    (8-135)

Otherwise (numMVPCandLX is equal to or greater than 2), all motion vector predictor candidates mvpListLX[idx] with idx greater than 1 are removed from the list.

7. The motion vector of mvpListLX[mvp_lX_flag[xP, yP]] is assigned to mvpLX.

In addition, the following modifications may apply for TMVP. When checking the POC values of each reference picture during TMVP, instead of checking every picture, it is modified that only pictures with RefPicTypeFunc( ) equal to 0 are checked. When RefPicTypeFunc( ) returns 0 for a short-term reference pictures in one alternative, this means only the short-term reference pictures are checked.

One detailed implementation, which may be implemented by video encoder 20 and video decoder 30, is as follows:

Derivation process for temporal luma motion vector prediction

Inputs to this process are a luma location (xP, yP) specifying the top-left luma sample of the current prediction unit relative to the top-left sample of the current picture, variables specifying the width and the height of the prediction unit for luma, nPSW and nPSH, the reference index of the current prediction unit partition refIdxLX (with X being 0 or 1).

Outputs of this process are the motion vector prediction mvLXCol, the availability flag availableFlagLXCol.

The function RefPicOrderCnt(picX, refIdx, LX) returns the picture order count PicOrderCntVal of the reference picture with index refIdx from reference picture list LX of the picture picX and is specified as follows.

RefPicOrderCnt(picX,refIdx,LX)=PicOrderCnt(RefPi-cListLX(refIdx) of the picture picX)    (8-141)

Depending on the values of slice_type, collocated_from_l0_flag, and collocated_ref_idx, the variable colPic, specifying the picture that contains the collocated partition, is derived as follows.

If slice_type is equal to B and collocated_from_l0_flag is equal to 0, the variable colPic specifies the picture that contains the collocated partition as specified by RefPicLisT1 [collocated_ref_idx].

Otherwise (slice_type is equal to B and collocated_from_l0_flag is equal to 1 or slice_type is equal to P), the variable colPic specifies the picture that contains the collocated partition as specified by RefPicList0[collocated_ref_idx].

Variable colPu and its position (xPCol, yPCol) are derived in the following ordered steps:

1. The variable colPu is derived as follows yPRb=yP+nPSH    (8-149)

If (yP>>Log2CtbSize) is equal to (yPRb>>Log2CtbSize), the horizontal component of the right-bottom luma position of the current prediction unit is defined by xPRb=xP+nPSW    (8-150)

and the variable colPu is set as the prediction unit covering the modified position given by ((xPRb>>4)<<4, (yPRb>>4)<<4) inside the colPic.

Otherwise ((yP>>Log2CtbSize) is not equal to (yPRb>>Log2CtbSize)), colPu is marked as "unavailable".

2. When colPu is coded in an intra-prediction mode or colPu is marked as "unavailable", the following applies.

Central luma position of the current prediction unit is defined by xPCtr=(xP+(nPSW>>1)    (8-151)

yPCtr=(yP+(nPSH>>1)    (8-152)

The variable colPu is set as the prediction unit covering the modified position given by ((xPCtr>>4)<<4, (yPCtr>>4)<<4) inside the colPic.

3. (xPCol, yPCol) is set equal to the top-left luma sample of the colPu relative to the top-left luma sample of the colPic.

The function LongTermRefPic(picX, refIdx, LX) is defined as follows. If the reference picture with index refIdx from reference picture list LX of the picture picX was marked as "used for long term reference" at the time when picX was the current picture, LongTermRefPic(picX, refIdx, LX) returns 1; otherwise LongTermRefPic(picX, refIdx, LX) returns 0.

The variables mvLXCol and availableFlagLXCol are derived as follows.

If one of the following conditions is true, both components of mvLXCol are set equal to 0 and availableFlagLXCol is set equal to 0.

colPu is coded in an intra prediction mode.

colPu is marked as "unavailable".

pic_temporal_mvp_enable_flag is equal to 0.

Otherwise, the motion vector mvCol, the reference index refIdxCol, and the reference list identifier listCol are derived as follows.

If PredFlagL0[xPCol][yPCol] is equal to 0, mvCol, refIdxCol, and listCol are set equal to MyL1[xPCol][yPCol], RefIdxL1[xPCol][yPCol], and L1, respectively.

Otherwise (PredFlagL0[xPCol][yPCol] is equal to 1), the following applies.

If PredFlagL1[xPCol][yPCol] is equal to 0, mvCol, refIdxCol, and listCol are set equal to MvL0[xPCol][yPCol], RefIdxL0[xPCol][yPCol], and L0, respectively.

Otherwise (PredFlagL1[xPCol][yPCol] is equal to 1), the following assignments are made.

If PicOrderCnt(pic) of every picture pic with RefPicTypeFunc(pic) equal to 0, (or "of every short-term picture pic" in one alternative) in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.

Otherwise (PicOrderCnt(pic) of at least one picture pic in at least one reference picture list is greater than PicOrderCntVal, mvCol, refIdxCol and listCol are set equal to MvLN[xPCol][yPCol], RefIdxLN[xPCol][yPCol] and LN, respectively with N being the value of collocated_from_l0_flag.

. . .

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

In this manner, video encoder 20 and video decoder 30 represent examples of a video coder (e.g., a video encoder or video decoder) configured to determine a first type for a current motion vector of a current block of video data, determine a second type for a candidate motion vector predictor of a neighboring block to the current block, set a variable representative of whether the candidate motion vector predictor is available to a value indicating that the candidate motion vector predictor is not available when the first type is different from the second type, and code the current motion vector based at least in part on the value of the variable. In addition, when the first type comprises a disparity motion vector, the second type comprises a disparity motion vector, and the candidate motion vector predictor is used to predict the current motion vector, the video coder may be configured to code the current motion vector without scaling the candidate motion vector predictor.

Figure 2:
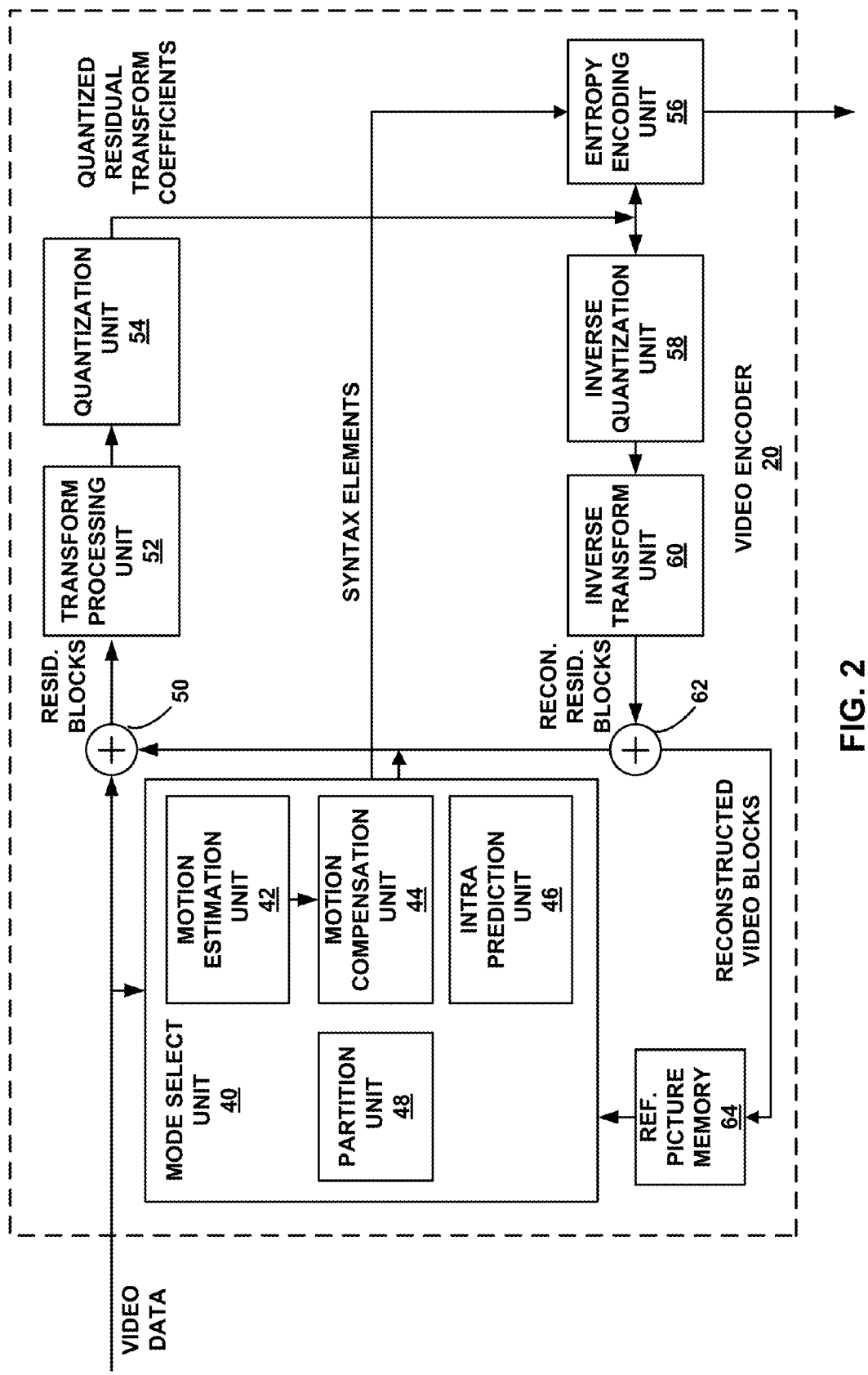
FIG. 2 is a block diagram illustrating an example of a video encoder that may implement techniques for coding motion vectors and for performing bi-prediction in HEVC and its extensions, such as multiview or 3DV extensions.

FIG. 2 is a block diagram illustrating an example of video encoder 20 that may implement techniques for coding motion vectors and for performing bi-prediction in HEVC and its extensions, such as multiview or 3DV extensions. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

In accordance with the techniques of this disclosure, when mode select unit 40 elects to inter-predict a block of video data (e.g., a PU) using motion estimation unit 42 and motion compensation unit 44, video encoder 20 may further encode the motion vector, e.g., using AMVP or merge mode. For example, entropy encoding unit 56 may receive a motion vector from mode select unit 40 and encode the motion vector. Entropy encoding unit 56 may entropy encode a motion vector using AMVP by selecting a neighboring block from which to retrieve a motion vector predictor and calculating a difference between the motion vector and the motion vector predictor (e.g., a horizontal motion vector difference and a vertical motion vector difference), then entropy encode one or more syntax elements representative of the difference(s).

In accordance with the techniques of this disclosure, entropy encoding unit 56 may set a candidate motion vector predictor as unavailable for use in AMVP (or merge mode) to predict a current motion vector when the candidate motion vector predictor has a different type than the current motion vector. Setting the candidate motion vector predictor as unavailable in this manner may be performed even after a different process determined that the candidate motion vector was available, based on other criteria. For example, if the candidate motion vector predictor is a disparity motion vector and the current motion vector is a temporal motion vector, entropy encoding unit 56 may set the candidate motion vector predictor as unavailable for use as a predictor for the current motion vector. Likewise, if the candidate motion vector predictor is a temporal motion vector and the current motion vector is a disparity motion vector, entropy encoding unit 56 may set the candidate motion vector predictor as unavailable for use as a predictor for the current motion vector.

Entropy encoding unit 56 may use one or more various techniques to determine whether a motion vector being encoded and a motion vector predictor are the same type of motion vector or different types of motion vector. In some examples, entropy encoding unit 56 may determine whether the motion vector being encoded and the candidate motion vector predictor refer to reference pictures having POC values that differ from a current picture being encoded. If one of the motion vector or candidate motion vector predictor refers to a reference picture having a POC value that differs from the current picture being encoded, and the other refers to a reference picture having a POC value that is the same as the current picture being encoded, entropy encoding unit 56 may determine that the motion vector and candidate motion vector predictor are different types of motion vectors. In particular, a motion vector that refers to a reference picture having a POC value that is the same as a current picture being encoded may be considered a disparity motion vector, whereas a motion vector that refers to a reference picture having a different POC value than the current picture may be considered a temporal motion vector.

As another example, entropy encoding unit 56 may determine whether the current motion vector refers to a reference picture in a current layer including the current picture being encoded, or a different layer. Likewise, entropy encoding unit 56 may determine whether the candidate motion vector predictor refers to a reference picture in the current layer or a different layer. If both the current motion vector and the candidate motion vector predictor refer to a reference picture in the current layer or a reference picture in a different layer, entropy encoding unit 56 may determine that the current motion vector and the candidate motion vector predictor are the same type of motion vector. In particular, if the current motion vector and the candidate motion vector predictor refer to reference pictures in one or more different layers, the current motion vector and the candidate motion vector predictor may comprise disparity motion vectors. If the current motion vector and the candidate motion vector predictor refer to reference pictures in the current layer, the current motion vector and the candidate motion vector predictor may comprise temporal motion vectors. If one of the current motion vector and the candidate motion vector predictor refers to a reference picture in the current layer, and the other refers to a reference picture in a different layer, entropy encoding unit 56 may determine that the current motion vector and the candidate motion vector predictor are different types of motion vectors.

As yet another example, entropy encoding unit 56 may determine whether the current motion vector refers to a long-term reference picture or a short-term reference picture, and likewise, whether the candidate motion vector predictor refers to a long-term reference picture or a short-term reference picture. If both the current motion vector and the candidate motion vector predictor refer to the same type of reference picture (i.e., both refer to a long-term reference picture or both refer to a short-term reference picture), entropy encoding unit 56 may determine that the current motion vector and the candidate motion vector predictor are the same type of motion vector. On the other hand, if one of the current motion vector and the candidate motion vector predictor refers to a long-term reference picture, and the other refers to a short-term reference picture, entropy encoding unit 56 may determine that the current motion vector and the candidate motion vector predictor are different types of motion vectors. Motion vectors referring to a long-term reference picture may comprise temporal motion vectors, whereas motion vectors referring to a short-term reference picture may comprise disparity motion vectors.

As discussed above, entropy encoding unit 56 may determine that a candidate motion vector of a different type than a current motion vector is unavailable for use as a motion vector predictor for the current motion vector. Thus, entropy encoding unit 56 may remove such candidate motion vector predictors from a list of candidate motion vector predictors for the current motion vector, or omit adding such a candidate motion vector predictor to the list of candidate motion vector predictors. In particular, entropy encoding unit 56 may set a value of a variable associated with a candidate motion vector predictor to indicate whether the candidate motion vector predictor is available for use as a motion vector predictor for the current motion vector. Moreover, entropy encoding unit 56 may be configured to select a candidate motion vector predictor that is the same type as a current motion vector to encode the current motion vector, e.g., for which the variable associated with the candidate motion vector predictor has a value indicating that the candidate motion vector predictor is available for use as a motion vector predictor for the current motion vector. Entropy encoding unit 56 may encode the current motion vector using various motion vector encoding modes, such as advanced motion vector predictor (AMVP) or merge mode.

In general, entropy encoding unit 56 may scale a motion vector predictor used as to predict a current motion vector when the motion vector predictor refers to a different reference picture than the reference picture referred to by the current motion vector (e.g., when POC values of the reference pictures are different). More particularly, entropy encoding unit 56 may scale a temporal motion vector predictor based on a difference between POC values of the reference pictures. When predicting a motion vector that is a disparity motion vector using a motion vector predictor that is also a disparity motion vector, however, entropy encoding unit 56 may disable motion vector predictor scaling.

Entropy encoding unit 56 may encode a motion vector by calculating motion vector difference values between the motion vector and a motion vector predictor, e.g., a motion vector predictor of the same type as the motion vector being coded. In general, a motion vector may be defined by a horizontal component (or x-component) and a vertical component (or y-component). Entropy encoding unit 56 may calculate MVDx (an x-component of a motion vector difference) as the difference between the x-component of the motion vector being encoded and the x-component of the motion vector predictor. Likewise, entropy encoding unit 56 may calculate MVDy (a y-component of the motion vector difference) as the difference between the y-component of the motion vector being encoded and the y-component of the motion vector predictor. In the case that the motion vector is a temporal motion vector, entropy encoding unit 56 may calculate the motion vector difference values (MVDx and MVDy) relative to a scaled version of the motion vector predictor (based on POC differences between reference pictures referred to by the motion vector being encoded and motion vector predictor). Entropy encoding unit 56 may then entropy encode MVDx and MVDy, e.g., using CABAC.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this manner, video encoder 20 of FIG. 2 represents an example of a video encoder configured to determine a first type for a current motion vector of a current block of video data, determine a second type for a candidate motion vector predictor of a neighboring block to the current block, set a variable representative of whether the candidate motion vector predictor is available to a value indicating that the candidate motion vector predictor is not available when the first type is different from the second type, and encode the current motion vector based at least in part on the value of the variable. In addition, when the first type comprises a disparity motion vector, the second type comprises a disparity motion vector, and the candidate motion vector predictor is used to predict the current motion vector, the video encoder may be configured to code the current motion vector without scaling the candidate motion vector predictor.

Figure 3:
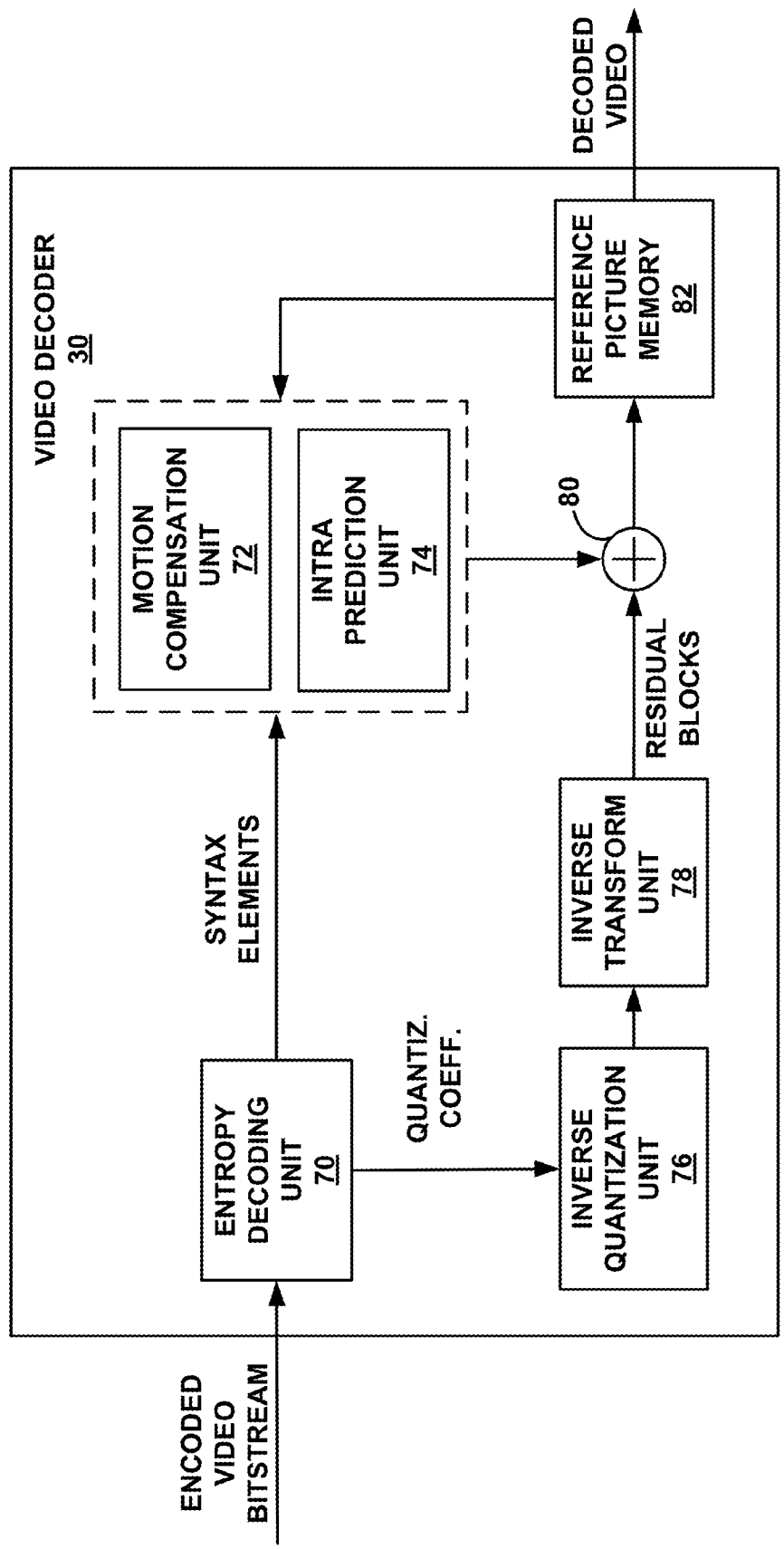
FIG. 3 is a block diagram illustrating an example of video decoder 30 that may implement techniques for coding motion vectors and for performing bi-prediction in HEVC and its extensions, such as multiview or 3DV extensions.

FIG. 3 is a block diagram illustrating an example of video decoder 30 that may implement techniques for coding motion vectors and for performing bi-prediction in HEVC and its extensions, such as multiview or 3DV extensions. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Entropy decoding unit 70 may entropy decode motion vectors for P- and B-coded blocks. For example, entropy decoding unit 70 may decode motion vectors using AMVP or merge mode. In particular, in accordance with the techniques of this disclosure, entropy decoding unit 70 may avoid using a candidate motion vector predictor having a different type than a current motion vector being decoded to decode the current motion vector. For example, when the current motion vector comprises a disparity motion vector, entropy decoding unit 70 may decode the current motion vector using a motion vector predictor that is also a disparity motion vector. Likewise, entropy decoding unit 70 may disable scaling when decoding a current motion vector using a motion vector predictor that comprises a disparity motion vector. As another example, when the current motion vector comprises a temporal motion vector, entropy decoding unit 70 may decode the current motion vector using a motion vector predictor that is also a temporal motion vector.

In accordance with the techniques of this disclosure, entropy decoding unit 70 may set a candidate motion vector predictor as unavailable for use in AMVP (or merge mode) to predict a current motion vector when the candidate motion vector predictor has a different type than the current motion vector. For example, if the candidate motion vector predictor is a disparity motion vector and the current motion vector is a temporal motion vector, entropy decoding unit 70 may set the candidate motion vector predictor as unavailable for use as a predictor for the current motion vector. Likewise, if the candidate motion vector predictor is a temporal motion vector and the current motion vector is a disparity motion vector, entropy decoding unit 70 may set the candidate motion vector predictor as unavailable for use as a predictor for the current motion vector.

Entropy decoding unit 70 may use one or more various techniques to determine whether a motion vector being decoded and a motion vector predictor are the same type of motion vector or different types of motion vector. In some examples, entropy decoding unit 70 may determine whether the motion vector being decoded and the candidate motion vector predictor refer to reference pictures having POC values that differ from a current picture being decoded. If one of the motion vector or candidate motion vector predictor refers to a reference picture having a POC value that differs from the current picture being decoded, and the other refers to a reference picture having a POC value that is the same as the current picture being decoded, entropy decoding unit 70 may determine that the motion vector and candidate motion vector predictor are different types of motion vectors. In particular, a motion vector that refers to a reference picture having a POC value that is the same as a current picture being decoded may be considered a disparity motion vector, whereas a motion vector that refers to a reference picture having a different POC value than the current picture may be considered a temporal motion vector.

As another example, entropy decoding unit 70 may determine whether the current motion vector refers to a reference picture in a current layer including the current picture being decoded, or a different layer. Likewise, entropy decoding unit 70 may determine whether the candidate motion vector predictor refers to a reference picture in the current layer or a different layer. If both the current motion vector and the candidate motion vector predictor refer to a reference picture in the current layer or a reference picture in a different layer, entropy decoding unit 70 may determine that the current motion vector and the candidate motion vector predictor are the same type of motion vector. In particular, if the current motion vector and the candidate motion vector predictor refer to reference pictures in one or more different layers, the current motion vector and the candidate motion vector predictor may comprise disparity motion vectors. If the current motion vector and the candidate motion vector predictor refer to reference pictures in the current layer, the current motion vector and the candidate motion vector predictor may comprise temporal motion vectors. If one of the current motion vector and the candidate motion vector predictor refers to a reference picture in the current layer, and the other refers to a reference picture in a different layer, entropy decoding unit 70 may determine that the current motion vector and the candidate motion vector predictor are different types of motion vectors.

As yet another example, entropy decoding unit 70 may determine whether the current motion vector refers to a long-term reference picture or a short-term reference picture, and likewise, whether the candidate motion vector predictor refers to a long-term reference picture or a short-term reference picture. If both the current motion vector and the candidate motion vector predictor refer to the same type of reference picture (i.e., both refer to a long-term reference picture or both refer to a short-term reference picture), entropy decoding unit 70 may determine that the current motion vector and the candidate motion vector predictor are the same type of motion vector. On the other hand, if one of the current motion vector and the candidate motion vector predictor refers to a long-term reference picture, and the other refers to a short-term reference picture, entropy decoding unit 70 may determine that the current motion vector and the candidate motion vector predictor are different types of motion vectors. Motion vectors referring to a long-term reference picture may comprise temporal motion vectors, whereas motion vectors referring to a short-term reference picture may comprise disparity motion vectors.

As discussed above, entropy decoding unit 70 may determine that a candidate motion vector of a different type than a current motion vector is unavailable for use as a motion vector predictor for the current motion vector. Thus, entropy decoding unit 70 may remove such candidate motion vector predictors from a list of candidate motion vector predictors for the current motion vector, or omit adding such a candidate motion vector predictor to the list of candidate motion vector predictors. Entropy decoding unit 70 may also set a variable associated with a candidate motion vector predictor indicative of whether the candidate motion vector is available for use as a motion vector predictor for the current motion vector, based on whether the candidate motion vector predictor has the same type as the current motion vector. Moreover, entropy decoding unit 70 may be configured to select a candidate motion vector predictor that is the same type as a current motion vector to decode the current motion vector, that is, whether the candidate motion vector predictor has an associated variable value indicating that the candidate motion vector predictor is available for use as a motion vector predictor for the current motion vector being decoded. Entropy decoding unit 70 may decode the current motion vector using various motion vector decoding modes, such as advanced motion vector predictor (AMVP) or merge mode.

To decode a current motion vector, entropy decoding unit 70 may select one of a plurality of candidate motion vector predictors (e.g., as indicated by syntax data, or according to an implicit selection process). When the selected motion vector predictor is a temporal motion vector, entropy decoding unit 70 may scale the selected motion vector predictor based on POC differences between the reference picture to which the motion vector predictor refers and the reference picture to which the current motion vector refers. Entropy decoding unit 70 may also decode syntax elements representing an MVDx value (that is, a horizontal or x-component of a motion vector difference) and an MVDy value (that is, a vertical or y-component of the motion vector difference). Entropy decoding unit 70 may also add the MVDx value to an x-component of the selected (and potentially scaled) motion vector predictor to reproduce the x-component of the current motion vector, and add the MVDy value to a y-component of the selected (and potentially scaled) motion vector predictor to reproduce the y-component of the current motion vector. Entropy decoding unit 70 may provide the reproduced (i.e., decoded) motion vector to motion compensation unit 72.

Motion compensation unit 72 may use the decoded motion vector to retrieve data from a previously decoded picture, e.g., from reference picture memory 82. Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_y$ calculated by video decoder 30 for each video block in the video slice to determine a degree of quantization and, likewise, a degree of inverse quantization that should be applied. Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Video decoder 30 may be configured to perform a decoding process in accordance with one or more techniques of this disclosure. In some examples, for each picture PIC, a flag ConsImplicitFlag is derived as equal to implicit_disabled_pic_flag[i] or implicit_disabled_pic_lX_flag[i] (with X equal to 0 for RefPicList0 or 1 for RefPicList1), when implicit_disabled_pic_flag[i] or implicit_disabled_pic_lX_flag[i] corresponds to the picture PIC. Alternatively, when a whole RPS subset is indicated to be constrained for implicit weighted prediction, each picture of this RPS subset has ConsImplicitFlag equal to 1, otherwise, each picture of this RPS subset may have ConsImplicitFlag equal to 0.

As one example, video decoder 30 may be configured to perform a weighted sample prediction process. Inputs to this process may include:
- a location (xB, yB) specifying the top-left sample of the current prediction unit relative to the top left sample of the current coding unit,
- the width and height of this prediction unit, nPSW and nPSH,
- two (nPSW)x(nPSH) arrays predSamplesL0 and predSamplesL1,
- prediction list utilization flags, predFlagL0 and predFlagL1,
- reference indices, refIdxL0 and refIdxL1,
- motion vectors, mvL0 and mvL1,
- the bit-depth of the chroma component, bitDepth.

Outputs of this process may include:
- the (nPSW)x(nPSH) array predSamples of prediction sample values.

Video decoder 30 may derive variables shift1, shift2, offset1 and offset2 as follows:
- The variable shift1 may be set equal to (14−bitDepth) and the variable shift2 may be set equal to (15−bitDepth),
- The variable offset1 may be set equal to 1<<(shift1−1) and the variable offset2 may be set equal to 1<<(shift2−1).

In P slices, if the value of predFlagL0 is equal to 1, the following may apply:
- If weighted_pred_flag is equal to 0, the default weighted sample prediction process as described in subclause 8.5.2.2.3.1 of WD6 of HEVC may be invoked with the same inputs and outputs as the process described in this subclause.
- Otherwise (weighted_pred_flag is equal to 1), the explicit weighted sample prediction process as described in subclause 8.5.2.2.3.2 of WD6 of HEVC may be invoked with the same inputs and outputs as the process described in this subclause.

In B slices, if predFlagL0 or predFlagL1 is equal to 1, the following may apply:
- If weighted_bipred_idc is equal to 0, the default weighted sample prediction process as described in subclause 8.5.2.2.3.1 of WD6 of HEVC may be invoked with the same inputs and outputs as the process described in this subclause.
- Otherwise, if weighted_bipred_idc is equal to 1 and if predFlagL0 or predFlagL1 equal to 1, the explicit weighted sample prediction process as described in subclause 8.5.2.2.3.2 of WD6 of HEVC may be invoked with the same inputs and outputs as the process described in this subclause.
- Otherwise if weighted_bipred_idc is equal to 2, the following may apply:
  If predFlagL0 is equal to 1 and predFlagL1 is equal to 1, the implicit weighted sample prediction process as described in subclause 8.5.2.2.3.2 of WD6 of HEVC may be invoked with the same inputs and outputs as the process described in this subclause.

Otherwise (predFlagL0 or predFlagL1 are equal to 1 but not both), the default weighted sample prediction process as described in subclause 8.5.2.2.3.1 of WD6 of HEVC may be invoked with the same inputs and outputs as the process described in this subclause.

Otherwise (weighted_bipred_idc is equal to 3), the following may apply:

If predFlagL0 is equal to 1 and predFlagL1 is equal to 1, and both ConsImplicitFlag(RefPicListL0(refIdxL0)) and ConsImplicitFlag(RefPicListL1(refIdxL1)) are equal to 1, the implicit weighted sample prediction process as described in subclause 8.5.2.2.3.2 of WD6 of HEVC may be invoked with the same inputs and outputs as the process described in this subclause.

Otherwise (predFlagL0 or predFlagL1 is equal to 1 but not both are equal to 1), the default weighted sample prediction process as described in subclause 8.5.2.2.3.1 of WD6 of HEVC may be invoked with the same inputs and outputs as the process described in this subclause.

Alternatively, the implicit method when weighted_bipred_idc equal to 2 can be directly changed to what is specified above for weighted_bipred_idc equal to 3.

In this manner, video decoder 30 of FIG. 3 represents an example of a video decoder configured to determine a first type for a current motion vector of a current block of video data, determine a second type for a candidate motion vector predictor of a neighboring block to the current block, set a variable representative of whether the candidate motion vector predictor is available to a value indicating that the candidate motion vector predictor is not available when the first type is different from the second type, and decode the current motion vector based at least in part on the value of the variable. In addition, when the first type comprises a disparity motion vector, the second type comprises a disparity motion vector, and the candidate motion vector predictor is used to predict the current motion vector, the video decoder may be configured to code the current motion vector without scaling the candidate motion vector predictor.

Figure 4:
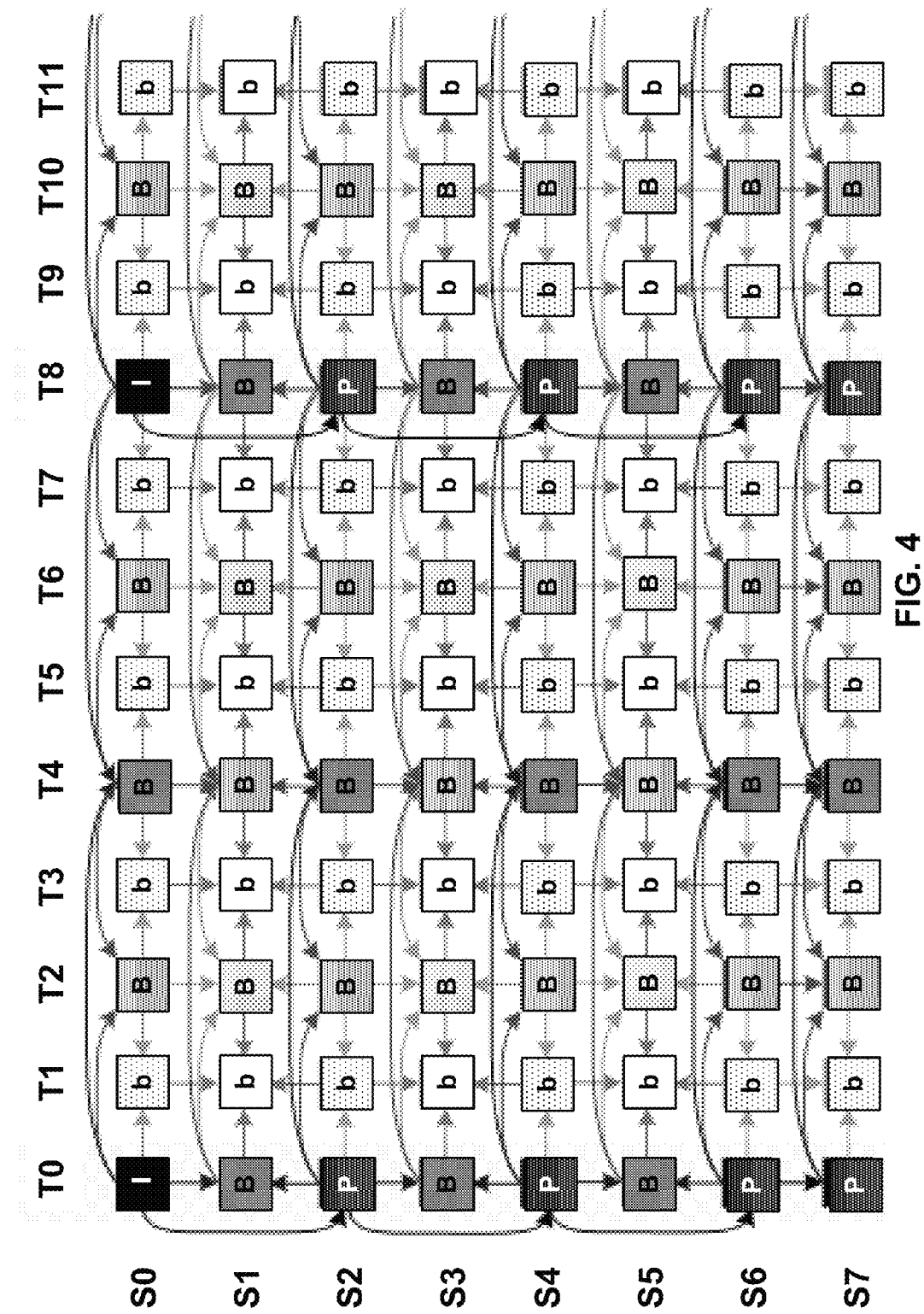
FIG. 4 is a conceptual diagram illustrating an example MVC prediction pattern.

FIG. 4 is a conceptual diagram illustrating an example MVC prediction pattern. In the example of FIG. 4, eight views (having view IDs "S0" through "S7") are illustrated, and twelve temporal locations ("T0" through "T11") are illustrated for each view. That is, each row in FIG. 4 corresponds to a view, while each column indicates a temporal location.

Although MVC has a so-called base view which is decodable by H.264/AVC decoders and stereo view pair could be supported also by MVC, the advantage of MVC is that it could support an example that uses more than two views as a 3D video input and decodes this 3D video represented by the multiple views. A renderer of a client having an MVC decoder may expect 3D video content with multiple views.

Frames in FIG. 4 are indicated at the intersection of each row and each column in FIG. 4 using a shaded block including a letter, designating whether the corresponding frame is intra-coded (that is, an I-frame), or inter-coded in one direction (that is, as a P-frame) or in multiple directions (that is, as a B-frame). In general, predictions are indicated by arrows, where the pointed-to frame uses the point-from object for prediction reference. For example, the P-frame of view S2 at temporal location T0 is predicted from the I-frame of view S0 at temporal location T0.

As with single view video encoding, frames of a multi-view video coding video sequence may be predictively encoded with respect to frames at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

In the MVC extension of H.264/AVC, as an example, inter-view prediction is supported by disparity motion compensation, which uses the syntax of the H.264/AVC motion compensation, but allows a picture in a different view to be used as a reference picture. Coding of two views can be supported by MVC, which is generally referred to as stereoscopic views. One of the advantages of MVC is that an MVC encoder could take more than two views as a 3D video input and an MVC decoder can decode such a multiview representation. So a rendering device with an MVC decoder may expect 3D video contents with more than two views.

In MVC, inter-view prediction is allowed among pictures in the same access unit (that is, with the same time instance). An access unit is, generally, a unit of data including all view components (e.g., all NAL units) for a common temporal instance. Thus, in MVC, inter-view prediction is permitted among pictures in the same access unit. When coding a picture in one of the non-base views, the picture may be added into a reference picture list, if it is in a different view but with the same time instance (e.g., the same POC value, and thus, in the same access unit). An inter-view prediction reference picture may be put in any position of a reference picture list, just like any inter prediction reference picture.

FIG. 4 provides various examples of inter-view prediction. Frames of view S1, in the example of FIG. 4, are illustrated as being predicted from frames at different temporal locations of view S1, as well as inter-view predicted from frames of frames of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 4, capital "B" and lowercase "b" are intended to indicate different hierarchical relationships between frames, rather than different encoding methodologies. In general, capital "B" frames are relatively higher in the prediction hierarchy than lowercase "b" frames. FIG. 4 also illustrates variations in the prediction hierarchy using different levels of shading, where a greater amount of shading (that is, relatively darker) frames are higher in the prediction hierarchy than those frames having less shading (that is, relatively lighter). For example, all I-frames in FIG. 4 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that frames relatively higher in the prediction hierarchy should be decoded before decoding frames that are relatively lower in the hierarchy, such that those frames relatively higher in the hierarchy can be used as reference frames during decoding of the frames relatively lower in the hierarchy. A view order index is an index that indicates the decoding order of view components in an access unit. The view order indices are implied in the SPS MVC extension, as specified in Annex H of H.264/AVC (the MVC amendment). In the SPS, for each index i, the corresponding view_id is signaled. In some examples, the decoding of the view components shall follow the ascending order of the view order index. If all the views are presented, then the view order indexes are in a consecutive order from 0 to num_views_minus_1.

In this manner, frames used as reference frames may be decoded before decoding the frames that are encoded with reference to the reference frames. A view order index is an index that indicates the decoding order of view components in an access unit. For each view order index i, the corresponding view_id is signaled. The decoding of the view components follows the ascending order of the view order indexes. If all the views are presented, then the set of view order indexes may comprise a consecutively ordered set from zero to one less than the full number of views.

For certain frames at equal levels of the hierarchy, decoding order may not matter relative to each other. For example, the I-frame of view S0 at temporal location T0 is used as a reference frame for the P-frame of view S2 at temporal location T0, which is in turn used as a reference frame for the P-frame of view S4 at temporal location T0. Accordingly, the I-frame of view S0 at temporal location T0 should be decoded before the P-frame of view S2 at temporal location T0, which should be decoded before the P-frame of view S4 at temporal location T0. However, between views 51 and S3, a decoding order does not matter, because views 51 and S3 do not rely on each other for prediction, but instead are predicted only from views that are higher in the prediction hierarchy. Moreover, view 51 may be decoded before view S4, so long as view 51 is decoded after views S0 and S2.

In this manner, a hierarchical ordering may be used to describe views S0 through S7. Let the notation SA>SB mean that view SA should be decoded before view SB. Using this notation, S0>S2 >S4>S6>S7, in the example of FIG. 4. Also, with respect to the example of FIG. 4, S0>S1, S2>S1, S2>S3, S4>S3, S4>S5, and S6 >S5. Any decoding order for the views that does not violate these requirements is possible. Accordingly, many different decoding orders are possible, with only certain limitations.

Figure 5:
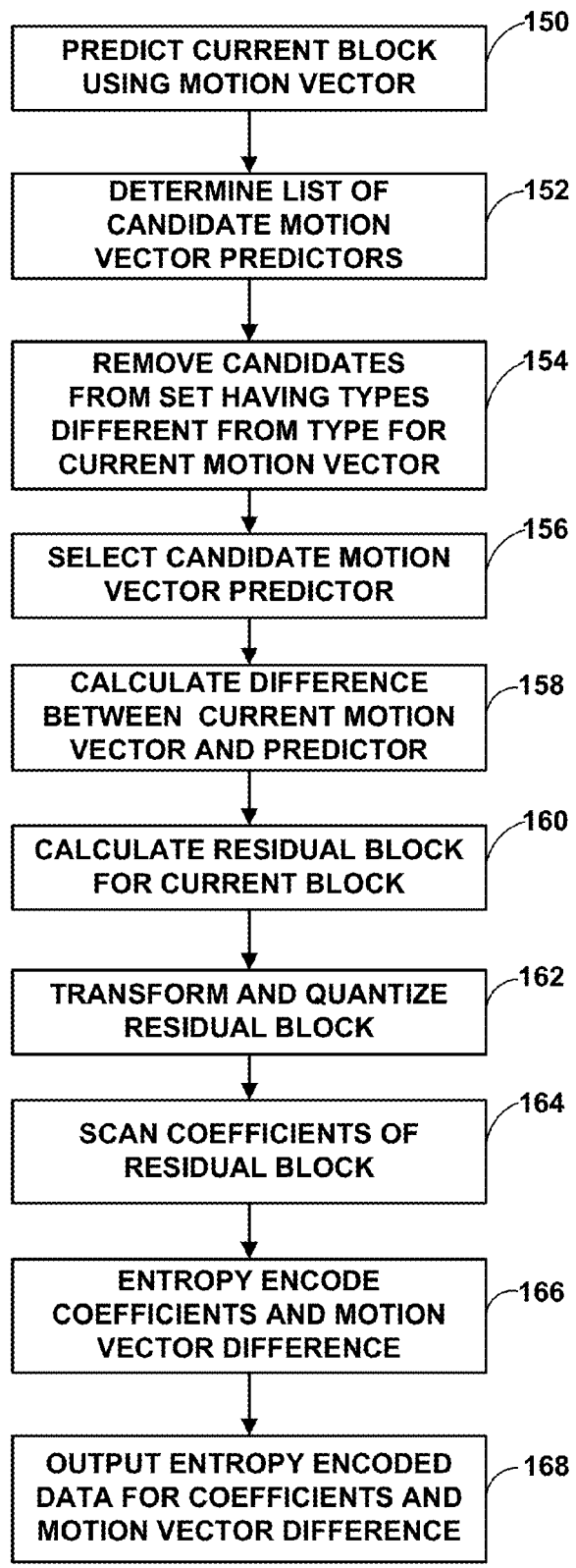
FIG. 5 is a flowchart illustrating an example method for encoding a current block in accordance with the techniques of this disclosure.

FIG. 5 is a flowchart illustrating an example method for encoding a current block in accordance with the techniques of this disclosure. The current block may comprise a current CU or a portion of the current CU, e.g., a current PU. Although described with respect to video encoder 20 (FIGS. 1 and 2), it should be understood that other devices may be configured to perform a method similar to that of FIG. 5.

In this example, video encoder 20 initially predicts the current block (150). For example, video encoder 20 may calculate one or more prediction units (PUs) for the current block. In this example, it is assumed that video encoder 20 inter-predicts the current block. For example, motion estimation unit 42 may calculate a motion vector for the current block by performing a motion search of previously coded pictures, e.g., inter-view pictures and temporal pictures. Thus, motion estimation unit 42 may produce a temporal motion vector or a disparity motion vector to encode the current block.

Video encoder 20 may then encode the motion vector. In particular, entropy encoding unit 56 may determine a list of candidate motion vector predictors (152). For example, entropy encoding unit 56 may select motion vectors of one or more neighboring blocks as candidate motion vector predictors. Video encoder 20 may determine that each of the candidate motion vector predictors in the list is available based on criteria other than types for the motion vectors. Entropy encoding unit 56 may then determine whether any of the list of candidate motion vectors are of a different type than the current motion vector. Entropy encoding unit 56 may then remove the candidate motion vector predictors from the list of candidate motion vector predictors that have types that are different from the type for the current motion vector (154). In particular, entropy encoding unit 56 may set a variable indicative of whether a candidate motion vector predictor is available for use as a motion vector predictor based on whether the candidate motion vector predictor has a type that is different from the type of the current motion vector predictor being encoded. In this manner, video encoder 20 may set a variable to a value indicating that a candidate motion vector predictor is not available based on having a different type than the current motion vector, even when the candidate motion vector was previously determined to be available based on other criteria.

As discussed above, entropy encoding unit 56 may determine whether a candidate motion vector predictor has the same type as a current motion vector using one of a variety of different methods. For example, entropy encoding unit 56 may determine whether the candidate motion vector predictor refers to a reference picture having the same POC value, or a different POC value, than the current picture being encoded, and whether the reference picture referred to by the current motion vector has the same POC value, or a different POC value, than the current picture being encoded. As another example, entropy encoding unit 56 may determine whether the candidate motion vector predictor and the current motion vector both refer to reference pictures in the same layer as the current picture being encoded, or one or more different layers than the layer including the current picture being encoded. As yet another example, entropy encoding unit 56 may determine whether the candidate motion vector predictor and the current motion vector both refer to long-term reference pictures or short-term reference pictures.

After forming the list of candidate motion vector predictors, such that all candidate motion vector predictors have the same type as the current motion vector, entropy encoding unit 56 selects one of the candidate motion vector predictors to use as a motion vector predictor for the current motion vector (156). In particular entropy encoding unit 56 selects one of the candidate motion vector predictors for which the variable indicating whether the candidate motion vector predictor is available for use as a motion vector predictor for the current motion vector. If necessary, entropy encoding unit 56 may scale the selected motion vector predictor, e.g., if the selected motion vector predictor is a temporal motion vector referring to a reference picture having a POC value that differs from the POC value of the reference picture to which the current motion vector refers. If the selected motion vector is a disparity motion vector, entropy encoding unit 56 may disable motion vector predictor scaling. Entropy encoding unit 56 then calculates the difference between the current motion vector and the selected (and potentially scaled) motion vector predictor (158).

Video encoder 20 may then calculate a residual block for the current block, e.g., to produce a transform unit (TU) (160). To calculate the residual block, video encoder 20 may calculate a difference between the original, uncoded block and the predicted block for the current block. Video encoder 20 may then transform and quantize coefficients of the residual block (162). Next, video encoder 20 may scan the quantized transform coefficients of the residual block (164). During the scan, or following the scan, video encoder 20 may entropy encode the coefficients (166). For example, video encoder 20 may encode the coefficients using CAVLC or CABAC. Video encoder 20 may then output the entropy coded data of the block (168).

In this manner, the method of FIG. 5 represents an example of a method including determining a first type for a current motion vector of a current block of video data, determining a second type for a candidate motion vector predictor of a neighboring block to the current block, setting a variable representative of whether the candidate motion vector predictor is available to a value indicating that the candidate motion vector predictor is not available when the first type is different from the second type, and encoding the current motion vector based at least in part on the value of the variable.

Figure 6:
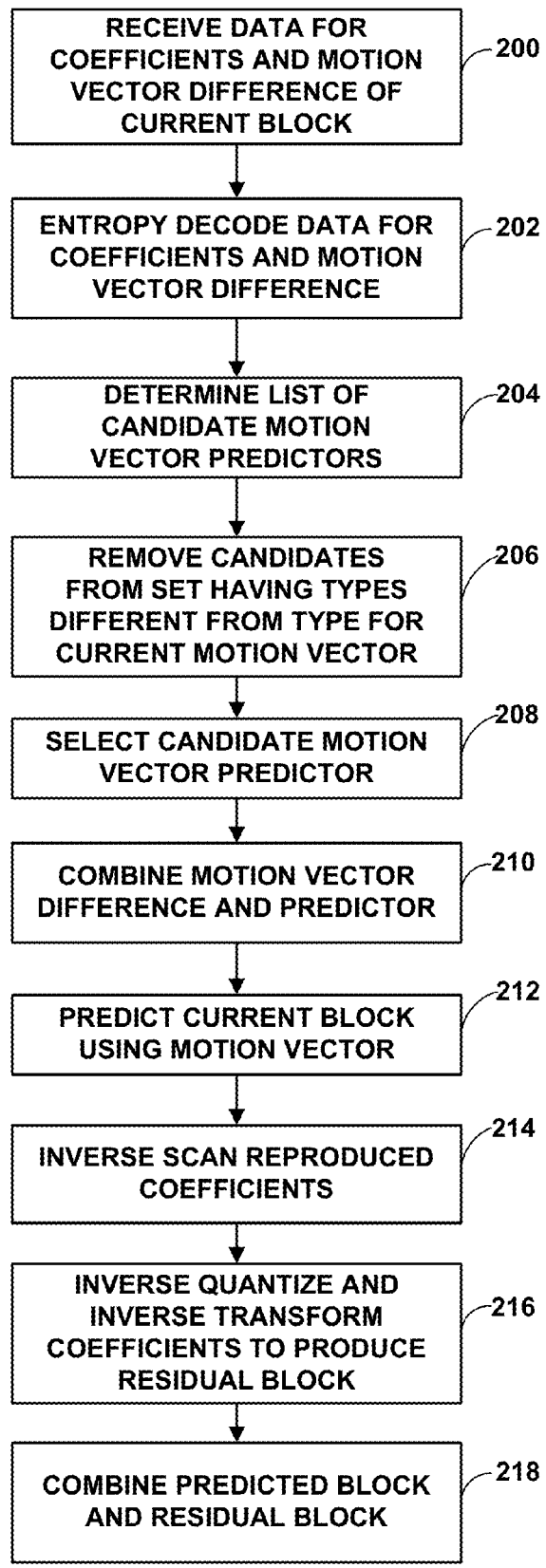
FIG. 6 is a flowchart illustrating an example method for decoding a current block of video data in accordance with the techniques of this disclosure.

FIG. 6 is a flowchart illustrating an example method for decoding a current block of video data in accordance with the techniques of this disclosure. The current block may comprise a current CU or a portion of the current CU (e.g., a PU). Although described with respect to video decoder 30 (FIGS. 1 and 3), it should be understood that other devices may be configured to perform a method similar to that of FIG. 6.

Initially, video decoder 30 receives data for transform coefficients and motion vector difference values of the current block (200). Entropy decoding unit 70 entropy decodes the data for the coefficients and the motion vector difference values (202). Entropy decoding unit 70 may then determine a list of candidate motion vector predictors (204). For example, entropy decoding unit 70 may select motion vectors of one or more neighboring blocks as candidate motion vector predictors. Video d3 coder 30 may determine that each of the candidate motion vector predictors in the list is available based on criteria other than types for the motion vectors. Entropy decoding unit 70 may then determine whether any of the list of candidate motion vectors are of a different type than the current motion vector. Entropy decoding unit 70 may then remove the candidate motion vector predictors from the list of candidate motion vector predictors that have types that are different from the type for the current motion vector (206). In particular, entropy decoding unit 70 sets a variable indicative of whether a candidate motion vector predictor is available for use as a motion vector predictor based on whether the candidate motion vector predictor has a type that is different from the type of the current motion vector predictor being encoded. In this manner, video decoder 30 may set a variable to a value indicating that a candidate motion vector predictor is not available based on having a different type than the current motion vector, even when the candidate motion vector was previously determined to be available based on other criteria.

As discussed above, entropy decoding unit 70 may determine whether a candidate motion vector predictor has the same type as a current motion vector using one of a variety of different methods. For example, entropy decoding unit 70 may determine whether the candidate motion vector predictor refers to a reference picture having the same POC value, or a different POC value, than the current picture being decoded, and whether the current motion vector also refers to a reference picture having the same POC value, or a different POC value, than the current picture being decoded.

As another example, entropy encoding unit 56 may determine whether the candidate motion vector predictor and the current motion vector both refer to reference pictures in the same layer as the current picture being encoded, or one or more different layers than the layer including the current picture being encoded. As yet another example, entropy encoding unit 56 may determine whether the candidate motion vector predictor and the current motion vector both refer to long-term reference pictures or short-term reference pictures.

Entropy decoding unit 70 then selects one of the candidate motion vector predictors that is available (i.e., having a variable value indicating that the candidate motion vector is available for use as a motion vector predictor for the current motion vector) as the motion vector predictor for the current motion vector (208). In some examples, entropy decoding unit 70 selects the motion vector predictor according to an implicit, predefined process, whereas in other examples, entropy decoding unit 70 decodes a syntax element indicative of which of the list of candidate motion vectors to select. Entropy decoding unit 70 then mathematically combines the decoded motion vector difference values with the motion vector predictor to reproduce the current motion vector (210). For example, entropy decoding unit 70 may add the x-component of the motion vector difference (MVDx) to the x-component of the selected motion vector predictor, and the y-component of the motion vector difference (MVDy) to the y-component of the selected motion vector predictor.

Video decoder 30 may predict the current block using the decoded motion vector (212). Video decoder 30 may then inverse scan the reproduced coefficients (214), to create a block of quantized transform coefficients. Video decoder 30 may then inverse quantize and inverse transform the coefficients to produce a residual block (216). Video decoder 30 may ultimately decode the current block by combining the predicted block and the residual block (218).

In this manner, the method of FIG. 6 represents an example of a method including determining a first type for a current motion vector of a current block of video data, determining a second type for a candidate motion vector predictor of a neighboring block to the current block, setting a variable representative of whether the candidate motion vector predictor is available to a value indicating that the candidate motion vector predictor is not available when the first type is different from the second type, and decoding the current motion vector based at least in part on the value of the variable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

determining a first type for a current motion vector of a current block of video data;

determining a second type for a candidate motion vector predictor of a neighboring block to the current block;

setting a variable representative of whether the candidate motion vector predictor is available for use as a motion vector predictor for the current motion vector to a first value indicating that the candidate motion vector predictor is not available for use as the motion vector predictor for the current motion vector, wherein the variable can be set to either the first value or a second value, different from the first value, indicating that the candidate motion vector predictor is available for use as the motion vector predictor for the current motion vector;

determining whether the first type is different from the second type; and after initially setting the variable to the first value, setting the variable to the second value in response to determining that the first type is identical to the second type; and decoding the current motion vector based at least in part on the second value of the variable.

2. The method of claim 1, wherein determining the first type for the current motion vector comprises determining the first type based on a first reference picture subset to which a first reference picture referred to by the current motion vector belongs, and wherein determining the second type for the candidate motion vector comprises determining the second type based on a second reference picture subset to which a second reference picture referred to by the candidate motion vector predictor belongs.

3. The method of claim 2, wherein the current block is included within a picture of a current layer, and wherein determining that the first type is different from the second type comprises determining that the first type is different from the second type when the first reference picture is included in the current layer and the second reference picture is included in a layer other than the current layer.

4. The method of claim 2, wherein the current block is included within a picture of a current layer, and wherein determining that the first type is different from the second type comprises determining that the first type is different from the second type when the second reference picture is included in the current layer and the first reference picture is included in a layer other than the current layer.

5. The method of claim 1, further comprising, prior to setting the variable to the first value, determining that the candidate motion vector is available based on criteria other than whether the first type is different from the second type.

6. The method of claim 1, wherein the first type for the current motion vector represents whether a current reference picture order count (POC) value of a first reference picture referred to by the current motion vector is the same as a current POC value of a current picture including the current block, and wherein the second type for the candidate motion vector predictor represents whether a candidate reference POC value of a second reference picture referred to by the candidate motion vector predictor is the same as the current POC value.

7. The method of claim 6, further comprising decoding information indicating that, when at least one of the current reference POC value and the candidate reference POC value is the same as the current POC value, the neighboring block including the candidate motion vector predictor is to be set as unavailable for reference.

8. The method of claim 7, wherein decoding the current motion vector comprises decoding the current motion vector without scaling the candidate motion vector predictor when a type for the first reference picture referred to by the current motion vector is different than a type for the second reference picture referred to by the candidate motion vector predictor.

9. The method of claim 1, wherein decoding the current motion vector comprises decoding the current motion vector using at least one of advanced motion vector prediction (AMVP) mode and merge mode, the method further comprising, when decoding the motion vector using AMVP and when the variable indicates that the candidate motion vector predictor is not available, avoiding adding the motion vector predictor into an AMVP candidate list for the current motion vector, and when decoding the motion vector using merge mode and when the variable indicates that the candidate motion vector predictor is not available, avoiding adding the motion vector predictor into a merge candidate list for the current motion vector.

10. The method of claim 1, further comprising decoding data indicative of whether, for all slices in a decoded video sequence of the video data, an inter-view reference is never chosen as a co-located picture of temporal motion vector prediction (TMVP) mode.

11. The method of claim 10, wherein decoding the data comprises decoding a disable_inter_view_as_tmvp_flag.

12. The method of claim 10, wherein decoding the data comprises decoding the data in at least one of extension bits for a multiview video decoding (MVC) extension, extension bits for a three-dimensional video (3DV) extension, a subset sequence parameter set (SPS), and a video parameter set (VPS).

13. The method of claim 1, further comprising determining a type for a reference picture set (RPS) subset including a reference picture to which the current motion vector refers, wherein determining the first type for the current motion vector comprises determining that the first type is equal to the type for the RPS subset.

14. A method of encoding video data, the method comprising:
    determining a first type for a current motion vector of a current block of video data;
    determining a second type for a candidate motion vector predictor of a neighboring block;
    setting a variable representative of whether the candidate motion vector predictor is available for use as a motion vector predictor for the current motion vector to a first value indicating that the candidate motion vector predictor is not available for use as the motion vector predictor for the current motion vector, wherein the variable can be set to either the first value or a second value, different from the first value, indicating that the candidate motion vector predictor is available for use as the motion vector predictor for the current motion vector;
    determining whether the first type is different from the second type; and
    after initially setting the variable to the first value, setting the variable to the second value in response to determining that the first type is identical to the second type; and
    encoding the current motion vector based at least in part on the second value of the variable.

15. The method of claim 14,
    wherein determining the first type for the current motion vector comprises determining the first type based on a first reference picture subset to which a first reference picture referred to by the current motion vector belongs, and
    wherein determining the second type for the candidate motion vector comprises determining the second type based on a second reference picture subset to which a second reference picture referred to by the candidate motion vector predictor belongs.

16. The method of claim 15, wherein the current block is included within a picture of a current layer, and wherein determining that the first type is different from the second type comprises determining that the first type is different from the second type when the first reference picture is included in the current layer and the second reference picture is included in a layer other than the current layer.

17. The method of claim 15, wherein the current block is included within a picture of a current layer, and wherein determining that the first type is different from the second type comprises determining that the first type is different from the second type when the second reference picture is included in the current layer and the first reference picture is included in a layer other than the current layer.

18. The method of claim 14, further comprising, prior to setting the variable to the first value, determining that the candidate motion vector is available based on criteria other than whether the first type is different from the second type.

19. The method of claim 14,
    wherein the first type for the current motion vector represents whether a current reference picture order count (POC) value of a first reference picture referred to by the current motion vector is the same as a current POC value of a current picture including the current block, and
    wherein the second type for the candidate motion vector predictor represents whether a candidate reference POC value of a second reference picture referred to by the candidate motion vector predictor is the same as the current POC value.

20. The method of claim 19, further comprising encoding information indicating that, when at least one of the current reference POC value and the candidate reference POC value is the same as the current POC value, the neighboring block including the candidate motion vector predictor is to be set as unavailable for reference.

21. The method of claim 20, wherein encoding the current motion vector comprises encoding the current motion vector without scaling the candidate motion vector predictor when a type for the first reference picture referred to by the current motion vector is different than a type for the second reference picture referred to by the candidate motion vector predictor.

22. The method of claim 14, wherein encoding the current motion vector comprises encoding the current motion vector using at least one of advanced motion vector prediction (AMVP) mode and merge mode, the method further comprising, when encoding the motion vector using AMVP and when the variable indicates that the candidate motion vector predictor is not available, avoiding adding the motion vector predictor into an AMVP candidate list for the current motion vector, and when encoding the motion vector using merge mode and when the variable indicates that the candidate motion vector predictor is not available, avoiding adding the motion vector predictor into a merge candidate list for the current motion vector.

23. The method of claim 14, further comprising encoding data indicative of whether, for all slices in a encoded video sequence of the video data, an inter-view reference is never chosen as a co-located picture of temporal motion vector prediction (TMVP) mode.

24. The method of claim 23, wherein encoding the data comprises encoding a disable_inter_view_as_tmvp_flag.

25. The method of claim 23, wherein encoding the data comprises encoding the data in at least one of extension bits for a multiview video encoding (MVC) extension, extension bits for a three-dimensional video (3DV) extension, a subset sequence parameter set (SPS), and a video parameter set (VPS).

26. The method of claim 14, further comprising determining a type for a reference picture set (RPS) subset including a reference picture to which the current motion vector refers, wherein determining the first type for the current motion vector comprises determining that the first type is equal to the type for the RPS subset.

27. A device for decoding video data, the device comprising:
a memory configured to store video data; and
a video decoder configured to:
determine a first type for a current motion vector of a current block of the video data,
determine a second type for a candidate motion vector predictor of a neighboring block to the current block,
set a variable representative of whether the candidate motion vector predictor is available for use as a motion vector predictor for the current motion vector to a first value indicating that the candidate motion vector predictor is not available for use as the motion vector predictor for the current motion vector, wherein the variable can be set to either the first value or a second value, different from the first value, indicating that the candidate motion vector predictor is available for use as the motion vector predictor for the current motion vector,
determine whether the first type is different from the second type, and
after initially setting the variable to the first value, set the variable to the second value in response to determining that the first type is identical to the second type, and
decode the current motion vector based at least in part on the second value of the variable.

28. The device of claim 27, wherein the video decoder is configured to determine the first type for the current motion vector based on a first reference picture subset to which a first reference picture referred to by the current motion vector belongs, and wherein the video decoder is configured to determine the second type based on a second reference picture subset to which a second reference picture referred to by the candidate motion vector predictor belongs.

29. The device of claim 27, wherein the video decoder is further configured to, prior to setting the variable to the first value, determine that the candidate motion vector is available based on criteria other than whether the first type is different from the second type.

30. The device of claim 27,
wherein the first type for the current motion vector represents whether a current reference POC value of a first reference picture referred to by the current motion vector is the same as a current POC value of a current picture including the current block, and
wherein the second type for the candidate motion vector predictor represents whether a candidate reference POC value of a second reference picture referred to by the candidate motion vector predictor is the same as the current POC value.

31. The device of claim 30, wherein the video decoder is further configured to decode information indicating that, when at least one of the current reference POC value and the candidate reference POC value is the same as the current POC value, the neighboring block is to be set as unavailable for reference.

32. The device of claim 27, wherein to decode the current motion vector, the video decoder is configured to decode the current motion vector using at least one of advanced motion vector prediction (AMVP) mode and merge mode, wherein when decoding the motion vector using AMVP and when the variable indicates that the candidate motion vector predictor is not available, the video decoder is configured to avoid adding the motion vector predictor into an AMVP candidate list for the current motion vector, and when decoding the motion vector using merge mode and when the variable indicates that the candidate motion vector predictor is not available, the video decoder is configured to avoid adding the motion vector predictor into a merge candidate list for the current motion vector.

33. The device of claim 27, wherein the video decoder is configured to decode data indicative of whether, for all slices in a decoded video sequence of the video data, an inter-view reference is never chosen as a co-located picture of temporal motion vector prediction (TMVP) mode.

34. The device of claim 33, wherein the data comprises a disable_inter_view_as_tmvp_flag.

35. The device of claim 27, wherein the video decoder is configured to determine a type for a reference picture set (RPS) subset including a reference picture to which the current motion vector refers, wherein to determine the first type for the current motion vector, the video decoder is configured to determine that the first type is equal to the type for the RPS subset.

36. The device of claim 27, wherein the video decoder is configured to decode the current motion vector, decode residual data for the current block, form predicted data for the current block based at least in part on the current motion vector, and combine the predicted data and the residual data to reconstruct the current block.

37. The device of claim 27, further comprising a video encoder configured to encode the current motion vector, form predicted data for the current block based at least in part on the current motion vector, calculate residual data for the current block based on differences between the current block and the predicted data, and encode the residual data.

38. The device of claim 27, wherein the device comprises at least one of:
an integrated circuit;
a microprocessor; and
a wireless communication device that includes the video decoder.

39. A device for encoding video data, the device comprising:
a memory configured to store video data; and
a video encoder configured to:
determine a first type for a current motion vector of a current block of the video data,
determine a second type for a candidate motion vector predictor of a neighboring block to the current block,
set a variable representative of whether the candidate motion vector predictor is available for use as a motion vector predictor for the current motion vector to a first value indicating that the candidate motion vector predictor is not available for use as the motion vector predictor for the current motion vector, wherein the variable can be set to either the first value or a second value, different from the first value, indicating that the candidate motion vector predictor is available for use as the motion vector predictor for the current motion vector, determine whether the first type is different from the second type, and after initially setting the variable to the first value, set the variable to the second value in response to determining that the first type is identical to the second type, and encode the current motion vector based at least in part on the second value of the variable.

40. The device of claim 39, wherein the video encoder is configured to determine the first type for the current motion vector based on a first reference picture subset to which a first reference picture referred to by the current motion vector belongs, and wherein the video encoder is configured to determine the second type based on a second reference picture subset to which a second reference picture referred to by the candidate motion vector predictor belongs.

41. The device of claim 39, wherein the video encoder is further configured to, prior to setting the variable to the first value, determine that the candidate motion vector is available based on criteria other than whether the first type is different from the second type.

42. The device of claim 39, wherein the first type for the current motion vector represents whether a current reference POC value of a first reference picture referred to by the current motion vector is the same as a current POC value of a current picture including the current block, and wherein the second type for the candidate motion vector predictor represents whether a candidate reference POC value of a second reference picture referred to by the candidate motion vector predictor is the same as the current POC value.

43. The device of claim 42, wherein the video encoder is further configured to encode information indicating that, when at least one of the current reference POC value and the candidate reference POC value is the same as the current POC value, the neighboring block is to be set as unavailable for reference.

44. The device of claim 39, wherein to encode the current motion vector, the video encoder is configured to encode the current motion vector using at least one of advanced motion vector prediction (AMVP) mode and merge mode, wherein when encoding the motion vector using AMVP and when the variable indicates that the candidate motion vector predictor is not available, the video encoder is configured to avoid adding the motion vector predictor into an AMVP candidate list for the current motion vector, and when encoding the motion vector using merge mode and when the variable indicates that the candidate motion vector predictor is not available, the video encoder is configured to avoid adding the motion vector predictor into a merge candidate list for the current motion vector.

45. The device of claim 39, wherein the video encoder is configured to encode data indicative of whether, for all slices in a encoded video sequence of the video data, an inter-view reference is never chosen as a co-located picture of temporal motion vector prediction (TMVP) mode.

46. The device of claim 45, wherein the data comprises a disable_inter_view_as_tmvp_flag.

47. The device of claim 39, wherein the video encoder is configured to determine a type for a reference picture set (RPS) subset including a reference picture to which the current motion vector refers, wherein to determine the first type for the current motion vector, the video encoder is configured to determine that the first type is equal to the type for the RPS subset.

48. The device of claim 39, further comprising a video decoder configured to decode the current motion vector, decode residual data for the current block, form predicted data for the current block based at least in part on the current motion vector, and combine the predicted data and the residual data to reconstruct the current block.

49. The device of claim 39, wherein the video encoder is configured to encode the current motion vector, form predicted data for the current block based at least in part on the current motion vector, calculate residual data for the current block based on differences between the current block and the predicted data, and encode the residual data.

50. A device for encoding video data, the device comprising:

means for determining a first type for a current motion vector of a current block of video data;

means for determining a second type for a candidate motion vector predictor of a neighboring block to the current block;

means for setting a variable representative of whether the candidate motion vector predictor is available for use as a motion vector predictor for the current motion vector to a first value indicating that the candidate motion vector predictor is not available for use as the motion vector predictor for the current motion vector, wherein the variable can be set to either the first value or a second value, different from the first value, indicating that the candidate motion vector predictor is available for use as the motion vector predictor for the current motion vector;

means for determining whether the first type is different from the second type; and means for setting, after initially setting the variable to the first value, the variable to the second value in response to determining that the first type is identical to the second type; and means for encoding the current motion vector based at least in part on the second value of the variable.

51. A non-transitory computer-readable storage medium having stored thereon instructions that, when executed, cause a processor to:

determine a first type for a current motion vector of a current block of video data;

determine a second type for a candidate motion vector predictor of a neighboring block to the current block;

set a variable representative of whether the candidate motion vector predictor is available for use as a motion vector predictor for the current motion vector to a first value indicating that the candidate motion vector predictor is not available for use as the motion vector predictor for the current motion vector, wherein the variable can be set to either the first value or a second value, different from the first value, indicating that the candidate motion vector predictor is available for use as the motion vector predictor for the current motion vector, determine whether the first type is different from the second type, and after initially setting the variable to the first value, set the variable to the second value in response to determining that the first type is identical to the second type, and decode the current motion vector based at least in part on the second value of the variable.

52. The method of claim 1, the method being executable on a wireless communication device, wherein the device comprises:

a memory configured to store the video data;

a processor configured to execute instructions to decode the video data stored in the memory; and a receiver configured to receive a signal including the video data and to store the video data from the signal to the memory.

53. The method of claim 52, wherein the wireless communication device is a cellular telephone and the signal is received by the receiver and modulated according to a cellular communication standard.

54. The device of claim 28, wherein the device is a wireless communication device, further comprising:

a receiver configured to a signal including the video data and to store the video data from the signal to the memory.

55. The device of claim 54, wherein the wireless communication device is a cellular telephone and the signal is received by the receiver and modulated according to a cellular communication standard.

* * * * *